US012574983B2

(12) United States Patent
Kishida et al.

(10) Patent No.: US 12,574,983 B2
(45) Date of Patent: Mar. 10, 2026

(54) BASE STATION AND TERMINAL APPARATUS

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 332 days.

(21) Appl. No.: 17/911,580

(22) PCT Filed: Mar. 16, 2021

(86) PCT No.: PCT/JP2021/010600
§ 371 (c)(1),
(2) Date: Sep. 14, 2022

(87) PCT Pub. No.: WO2021/187480
PCT Pub. Date: Sep. 23, 2021

(65) Prior Publication Data
US 2023/0142340 A1 May 11, 2023

(30) Foreign Application Priority Data

Mar. 17, 2020 (WO) .................. PCT/JP2020/011810

(51) Int. Cl.
*H04W 76/15* (2018.01)
*H04W 84/12* (2009.01)
(52) U.S. Cl.
CPC ............ *H04W 76/15* (2018.02); *H04W 84/12* (2013.01)

(58) Field of Classification Search
CPC ..... H04W 76/15; H04W 84/12; H04W 48/12; H04W 88/08; H04W 88/16; H04B 1/001; H04B 1/005; H04B 7/02
See application file for complete search history.

(56) References Cited

U.S. PATENT DOCUMENTS

| | | | | |
|---|---|---|---|---|
| 11,943,809 B2 * | 3/2024 | Jang | .................. | H04W 72/0446 |
| 2007/0150720 A1 * | 6/2007 | Oh | ......................... | H04L 63/065 |
| | | | | 713/153 |

(Continued)

FOREIGN PATENT DOCUMENTS

| | | |
|---|---|---|
| JP | 201011397 | 1/2010 |
| JP | 2011254458 | 12/2011 |

(Continued)

OTHER PUBLICATIONS

[No Author Listed], "Part 11: Wireless LAN Medium Access Control (MAC) and Physical Layer (PHY) Specifications ("Figure 4-25 Establishing the IEEE 802.11 association" and "11.3 STA authentication and association")," IEEE Std 802.11-2016, Dec. 7, 2016, 21 pages.

*Primary Examiner* — Andrew Wendell
(74) *Attorney, Agent, or Firm* — Fish & Richardson P.C.

(57) ABSTRACT

A base station of an embodiment includes first and second wireless signal processing units, and a link management unit. The first wireless signal processing unit is configured to transmit and receive wireless signals using the first channel. The second wireless signal processing unit is configured to transmit and receive wireless signals using a second channel different from the first channel. The link management unit manages link states of the first and second wireless signal processing units. Upon receiving a request for a multi-link from a terminal apparatus, the link management unit uses at least one of the first and second wireless signal processing units to execute association processing of the first wireless (Continued)

signal processing unit and association processing of the second wireless signal processing unit, and establishes a multi-link with the terminal apparatus.

2 Claims, 19 Drawing Sheets

(56)                    References Cited

U.S. PATENT DOCUMENTS

| | | | |
|---|---|---|---|
| 2009/0323608 A1 | 12/2009 | Adachi et al. | |
| 2011/0261735 A1 | 10/2011 | Cordeiro | |
| 2014/0146704 A1* | 5/2014 | Cho | H04L 5/06 |
| | | | 370/254 |
| 2014/0247711 A1 | 9/2014 | Gantman et al. | |
| 2016/0234420 A1* | 8/2016 | Lee | H04N 7/185 |
| 2018/0206284 A1* | 7/2018 | Zhou | H04L 1/1887 |
| 2019/0042524 A1* | 2/2019 | Das Sharma | G06F 13/4282 |
| 2019/0335454 A1 | 10/2019 | Huang et al. | |
| 2020/0252853 A1* | 8/2020 | Shi | H04W 40/22 |
| 2021/0029766 A1* | 1/2021 | Zhang | H04W 76/15 |
| 2021/0051574 A1* | 2/2021 | Chu | H04W 84/18 |
| 2021/0165756 A1* | 6/2021 | Das Sharma | G06F 13/4282 |
| 2021/0400662 A1* | 12/2021 | Huang | H04B 1/48 |
| 2023/0180318 A1* | 6/2023 | Inoue | H04W 76/15 |
| | | | 370/328 |
| 2023/0269683 A1* | 8/2023 | Kishida | H04W 52/0216 |
| | | | 370/503 |
| 2024/0098819 A1* | 3/2024 | Kishida | H04W 84/12 |
| 2024/0340685 A1* | 10/2024 | Kishida | H04W 52/0216 |

FOREIGN PATENT DOCUMENTS

| | | |
|---|---|---|
| JP | 2016514411 | 5/2016 |
| WO | WO 2020050773 A1 | 3/2020 |

* cited by examiner

Fig. 8

| STA FUNCTION | FREQUENCY BAND | LINK DESTINATION ID | MULTI-LINK | TID |
|---|---|---|---|---|
| STA1 | 6GHz | XX | O | #1,#2 |
| STA2 | 5GHz | XX | O | #1,#3 |
| STA3 | 2.4GHz | – | – | – |

Fig. 14

| STA FUNCTION | FREQUENCY | CHANNEL ID | LINK DESTINATION ID | MULTI-LINK | TID |
|---|---|---|---|---|---|
| STA1 | 6GHz | CH1 | – | – | – |
| | | CH2 | XX | ○ | #1,#2 |
| | | CH3 | – | – | – |
| STA2 | 6GHz | CH1 | – | – | – |
| | | CH2 | – | – | – |
| | | CH3 | XX | ○ | #1,#3 |

Fig. 15

| ... | POSSIBILITY OF MULTI-LINK | MULTI-LINK TARGET CHANNEL #1 | MULTI-LINK TARGET CHANNEL #2 | ... |
|---|---|---|---|---|

BASE STATION AND TERMINAL APPARATUS

CROSS-REFERENCE TO RELATED APPLICATIONS

This application is a National Stage application under 35 USC $371 of International Application No. PCT/JP2021/010600, having an International Filing Date of Mar. 16, 2021, and International Application No. PCT/JP2020/011810, having an International Filing Date of Mar. 17, 2020.

The disclosure of the prior applications are considered part of the disclosure of this application, and are incorporated by reference in their entirety into this application.

TECHNICAL FIELD

An embodiment relates to a base station and a terminal apparatus.

BACKGROUND ART

A wireless LAN (Local Area Network) is known as a wireless system for wirelessly connecting a base station and a terminal apparatus.

CITATION LIST

Non-Patent Literature

NPL 1: IEEE Std 802.11-2016, "FIG. 4-25 Establishing the IEEE 802.11 association" and "11.3 STA authentication and association", 7 Dec. 2016

SUMMARY OF THE INVENTION

Technical Problem

A problem to be solved is to improve the speed and stability of wireless communication.

Means for Solving the Problem

A base station of an embodiment includes a first wireless signal processing unit, a second wireless signal processing unit, and a link management unit. The first wireless signal processing unit is configured to be able to transmit and receive a wireless signal using a first channel. The second wireless signal processing unit is configured to be able to transmit and receive a wireless signal using a second channel that is different from the first channel. The link management unit manages the link state of the first wireless signal processing unit and the link state of the second wireless signal processing unit. Upon receiving a request for a multi-link from a terminal apparatus, the link management unit uses at least one of the first wireless signal processing unit and the second wireless signal processing unit to execute association processing of the first wireless signal processing unit and association processing of the second wireless signal processing unit and establishes a multi-link with the terminal apparatus.

Advantageous Effects of the Invention

The base station of the embodiment can improve the speed and stability of wireless communication.

BRIEF DESCRIPTION OF DRAWINGS

FIG. 8 is a table showing an example of link management information in the wireless system according to the first embodiment.

FIG. 14 is a table showing an example of link management information in the wireless system according to the third embodiment.

FIG. 15 is a conceptual diagram showing a specific example of a format of a beacon signal in a wireless system according to a fourth embodiment.

DESCRIPTION OF EMBODIMENTS

Figure 1:
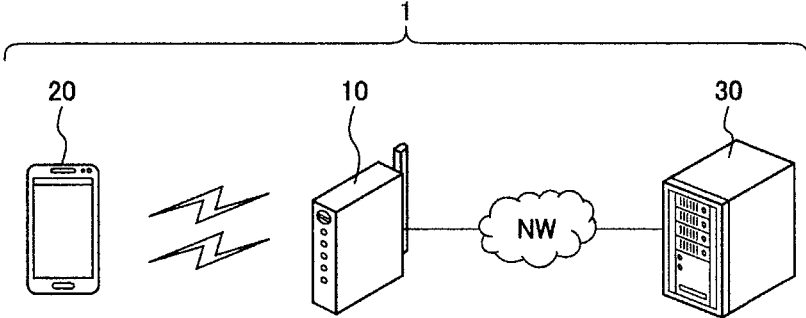
FIG. 1 is a conceptual diagram showing an example of an overall configuration of a wireless system according to a first embodiment.

Hereinafter, embodiments will be described with reference to the drawings. Each embodiment illustrates an apparatus or method for embodying the technical idea of the invention. The drawings are schematic or conceptual, and the dimensions and ratios of each drawing are not necessarily the same as the actual ones. The technical idea of the present invention is not specified by the shape, structure, arrangement, and the like of the constituent elements. In the following description, components having substantially the same function and configuration are denoted by the same reference numerals.

<1> First Embodiment

A wireless system 1 according to a first embodiment will be described hereinafter.

<1-1> Configuration of Wireless System 1

FIG. 1 shows an example of a configuration of the wireless system 1 according to the first embodiment. As shown in FIG. 1, the wireless system 1 includes, for example, a base station 10, a terminal apparatus 20, and a server 30.

The base station 10 is connected to a network NW and is used as an access point of a wireless LAN. For example, the base station 10 can wirelessly distribute data received from the network NW to the terminal apparatus 20. Also, the base station 10 can be connected to the terminal apparatus 20 using one type of band or a plurality of types of bands. In the present specification, a wireless connection between the base station 10 and the terminal apparatus 20 using a plurality of types of bands is referred to as a "multi-link". Communication between the base station 10 and the terminal apparatus 20 is based on, for example, the IEEE 802.11 standard.

The terminal apparatus 20 is, for example, a wireless terminal such as a smartphone or a tablet PC. The terminal apparatus 20 can transmit and receive data to and from a server 30 on the network NW via the base station 10, which is connected wirelessly. Note that the terminal apparatus 20 may be another electronic device such as a desktop computer or a laptop computer. The terminal apparatus 20 can be a device that can communicate with at least the base station 10 and can execute later-described operations.

The server 30 can hold various types of information, and for example, holds data of content for the terminal apparatus 20. The server 30 is connected to, for example, the network NW by wire, and is configured to be able to communicate with the base station 10 via the network NW. Note that the server 30 can be able to communicate with at least the base station 10. That is, communication between the base station 10 and the server 30 may be by wire or wireless.

<1-1-1> Configuration of Base Station 10

Figure 2:
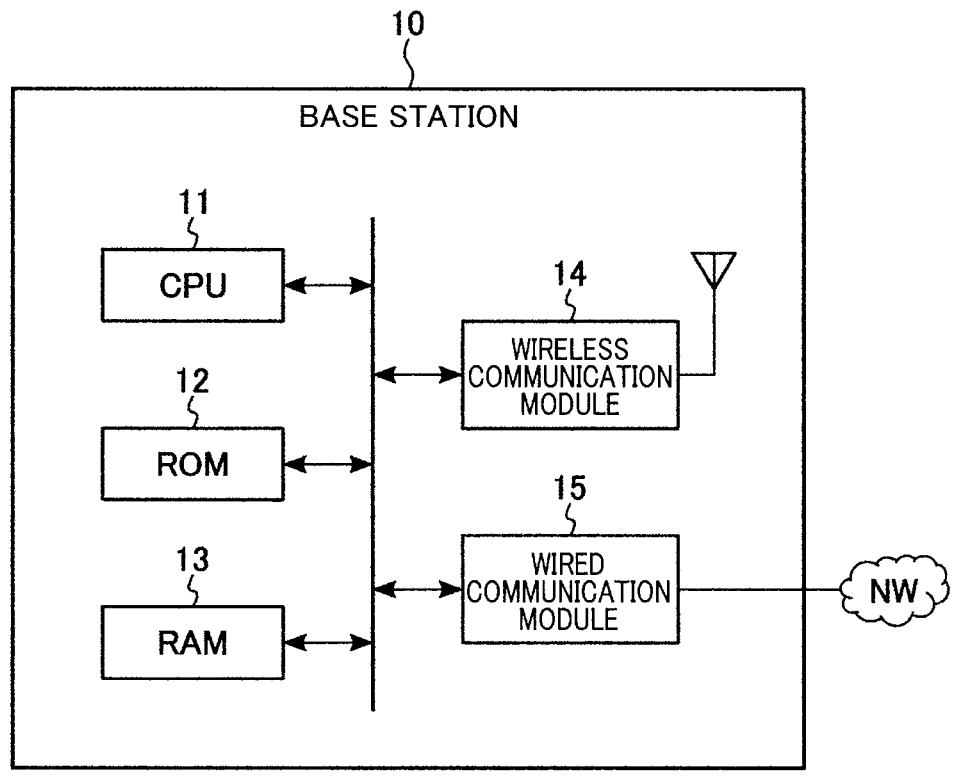
FIG. 2 is a block diagram showing an example of a configuration of a base station included in the wireless system according to the first embodiment.

FIG. 2 shows an example of a configuration of the base station 10 included in the wireless system 1 according to the first embodiment. As shown in FIG. 2, the base station 10 includes, for example, a CPU (Central Processing Unit) 11, a ROM (Read Only Memory) 12, a RAM (Random Access Memory) 13, a wireless communication module 14, and a wired communication module 15.

The CPU 11 is a circuit that can execute various programs, and controls the overall operation of the base station 10. The ROM 12 is a non-volatile semiconductor memory, and holds a program, control data, and the like for controlling the base station 10. The RAM 13 is, for example, a volatile semiconductor memory and is used as a work region of the CPU 11. The wireless communication module 14 is a circuit used for transmitting and receiving data by a wireless signal, and is connected to an antenna. Also, the wireless communication module 14 includes, for example, a plurality of communication modules respectively corresponding to a plurality of frequency bands. The wired communication module 15 is a circuit used for transmitting and receiving data by a wired signal, and is connected to the network NW.

<1-1-2> Configuration of Terminal Apparatus 20

Figure 3:
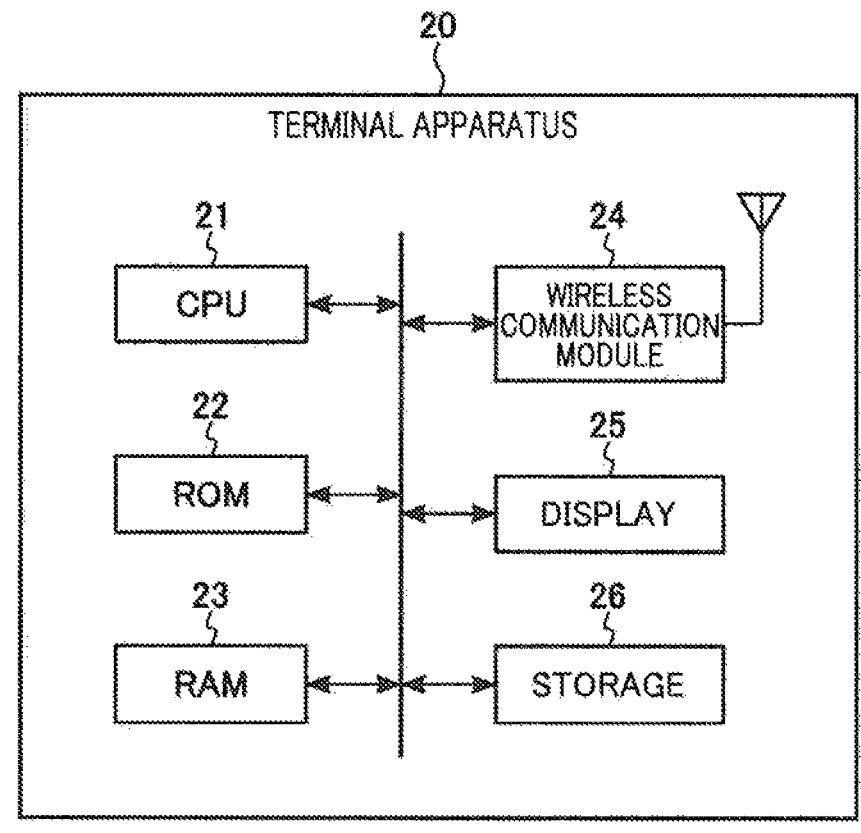
FIG. 3 is a block diagram showing an example of a configuration of a terminal apparatus included in the wireless system according to the first embodiment.

FIG. 3 shows an example of a configuration of the terminal apparatus 20 included in the wireless system 1 according to the first embodiment. As shown in FIG. 3, the terminal apparatus 20 includes, for example, a CPU 21, a ROM 22, a RAM 23, a wireless communication module 24, a display 25, and a storage 26.

The CPU 21 is a circuit that can execute various programs, and controls the overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work region of the CPU 21. The wireless communication module 24 is a circuit used for transmitting and receiving data by a wireless signal, and is connected to an antenna. Also, the wireless communication module 24 includes, for example, a plurality of communication modules that respectively correspond to a plurality of frequency bands. The display 25 displays, for example, a GUI (Graphical User Interface) corresponding to application software. The display 25 may include a function of an input interface of the terminal apparatus 20. The storage 26 is a non-volatile storage device, and holds, for example, system software and the like of the terminal apparatus 20.

<1-2> Operation of Wireless System 1

The wireless system 1 according to the first embodiment executes data communication based on an OSI (Open Systems Interconnection) reference model. In the OSI reference model, the communication function is divided into 7 layers (first layer: physical layer, second layer: data link layer, third layer: network layer, fourth layer: transport layer, fifth layer: session layer, sixth layer: presentation layer, seventh layer: application layer). The data link layer includes, for example, an LLC (Logical Link Control) layer and a MAC (Media Access Control) layer. In the present specification, the third to seventh layers are referred to as "upper layers" using the data link layer as a reference.

<1-2-1> Format of Wireless Frame

Figure 4:
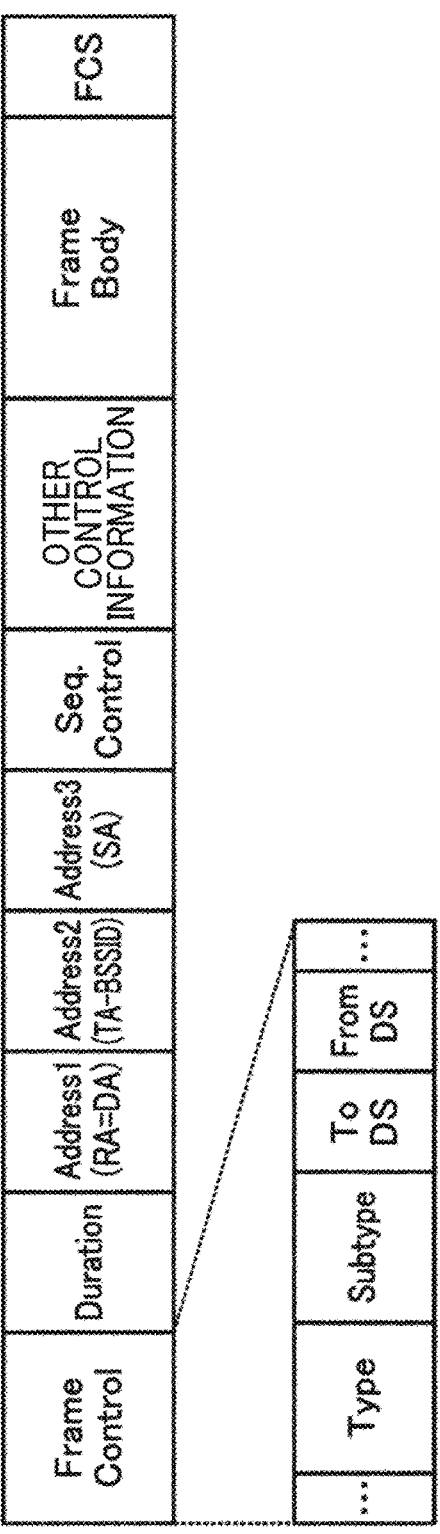
FIG. 4 is a conceptual diagram showing a specific example of a format of a wireless frame in the wireless system according to the first embodiment.

FIG. 4 shows a specific example of a format of a wireless frame in the wireless system 1 according to the first embodiment. As shown in FIG. 4, the wireless frame includes, for example, a Frame Control field, a Duration field, an Address1 field, an Address2 field, an Address3 field, a Sequence Control field, an other control information field, a Frame Body field, and an FCS (Frame Check Sequence) field. The Frame Control field to the other control information field correspond to, for example, a MAC header included in a MAC frame. The Frame Body field corresponds to, for example, a MAC payload contained in the MAC frame. The FCS field is information added in order to detect a frame error.

The Frame Control field indicates various types of control information and includes, for example, a Type value, a Subtype value, a To DS (To Distribution System) value, and a From DS value.

The Type value and Subtype value indicate the frame type of the wireless frame. For example, the Type value "00" indicates that the wireless frame is a management frame. The Type value "01" indicates that the wireless frame is a control frame. The Type value "10" indicates that the wireless frame is a data frame. Also, the content of the wireless frame changes depending on the combination of the Type value and the Subtype value.

The meaning of the To DS value and From DS value differs depending on the combination. For example, "00 (To DS/From DS)" indicates that the data is between terminal apparatuses in the same IBSS. "10" indicates that the data frame is directed to the DS (Distribution System) from the outside. "01" indicates that the data frame is to go out of the DS. "11" is used when forming a mesh network.

The Duration field indicates a scheduled period of using the wireless line. The Address field is used to indicate the BSSID, the transmission source address, the destination address, the sender terminal apparatus address, and the recipient terminal apparatus address.

The Sequence Control field shows the sequence number of the MAC frame and the fragment number for the fragment. The Frame Body field includes information corresponding to the type of the frame. For example, if the Frame Body field corresponds to a data frame, the data is stored in the Frame Body field. FCS stores the error detection code of the MAC header and Frame Body, and is used to determine whether or not there is an error.

<1-2-2> Functional Configuration of Wireless System 1

In the wireless system 1 according to the first embodiment, the base station 10 establishes a multi-link with the terminal apparatus 20 based on a request from the terminal apparatus 20. In this specification, an operation for establishing a multi-link between the base station 10 and the terminal apparatus 20 is referred to as "multi-link processing". First, the respective functional configurations of the base station 10 and the terminal apparatus 20 related to the multi-link processing of the wireless system 1 according to the first embodiment will be described sequentially.

(Functional Configuration of Base Station 10)

Figure 5:
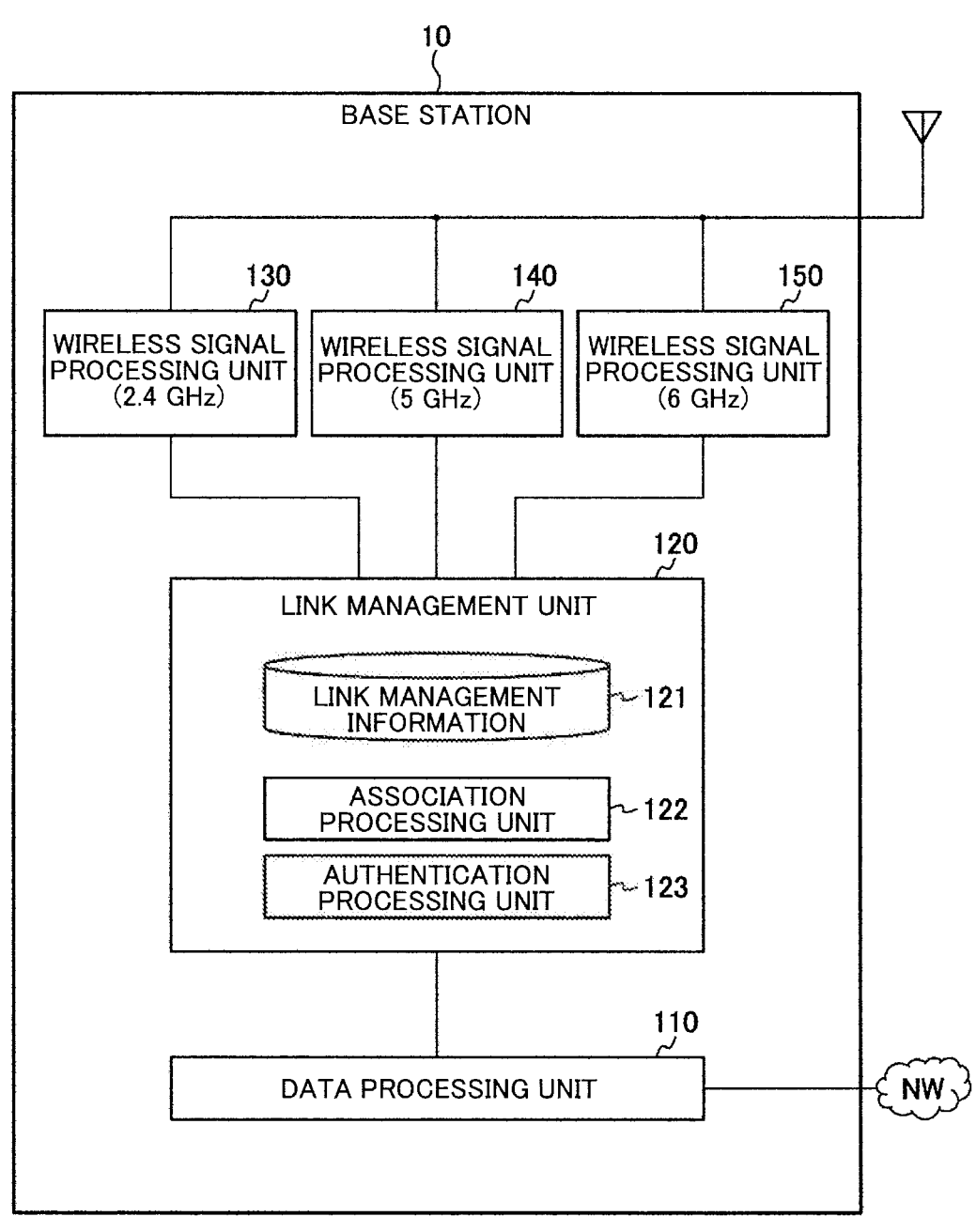
FIG. 5 is a block diagram showing an example of functions of the base station included in the wireless system according to the first embodiment.

FIG. 5 shows an example of the functional configuration of the base station 10 in the wireless system 1 according to the first embodiment. As shown in FIG. 5, the base station 10 can function as, for example, a data processing unit 110, a link management unit 120, and wireless signal processing units 130, 140, and 150.

The data processing unit 110 can execute the processing of the LLC layer and the processing of the upper layer on the input data. For example, the data processing unit 110 outputs the data input from the server 30 via the network NW to the link management unit 120. Also, the data processing unit 110 transmits the data input from the link management unit 120 to the server 30 via the network NW.

The link management unit 120 can execute, for example, some of the processing of the MAC layer on the input data. Also, the link management unit 120 manages the link with the terminal apparatus 20 based on notifications from the wireless signal processing units 130, 140, and 150. The link management unit 120 includes link management information 121. The link management information 121 is stored in, for example, the RAM 13, and includes information on the terminal apparatus 20 that is wirelessly connected to the base station 10. The link management information 121 centrally manages the operation information of the wireless channel used by each wireless signal processing unit.

Also, the link management unit 120 includes an association processing unit 122 and an authentication processing unit 123. When the association processing unit 122 receives a connection request of the terminal apparatus 20 via one of the wireless signal processing units 130, 140, and 150, the association processing unit 122 executes a protocol related to the association. The authentication processing unit 123 executes a protocol related to authentication following the connection request.

Each of the wireless signal processing units 130, 140, and 150 can execute, for example, part of the processing of the MAC layer and the processing of the first layer on the input data or the wireless signal. That is, each of the wireless signal processing units 130, 140, and 150 performs transmission and reception of data between the base station 10 and the terminal apparatus 20 using wireless communication. The wireless signal processing unit 130 handles wireless signals in the 2.4 GHz band. The wireless signal processing unit 140 handles wireless signals in the 5 GHz band. The wireless signal processing unit 150 handles wireless signals in the 6 GHz band. The wireless signal processing units 130, 140, and 150 may or may not share the antenna of the base station 10.

For example, each of the wireless signal processing units 130, 140, and 150 creates a wireless frame using the data input from the link management unit 120. Then, each of the wireless signal processing units 130, 140, and 150 converts the wireless frame into a wireless signal and distributes the wireless signal via the antenna of the base station 10. Also, each of the wireless signal processing units 130, 140, and 150 converts the wireless signal received via the antenna of the base station 10 into a wireless frame and outputs the data included in the wireless frame to the link management unit 120.

(Functional Configuration of Terminal Apparatus 20)

Figure 6:
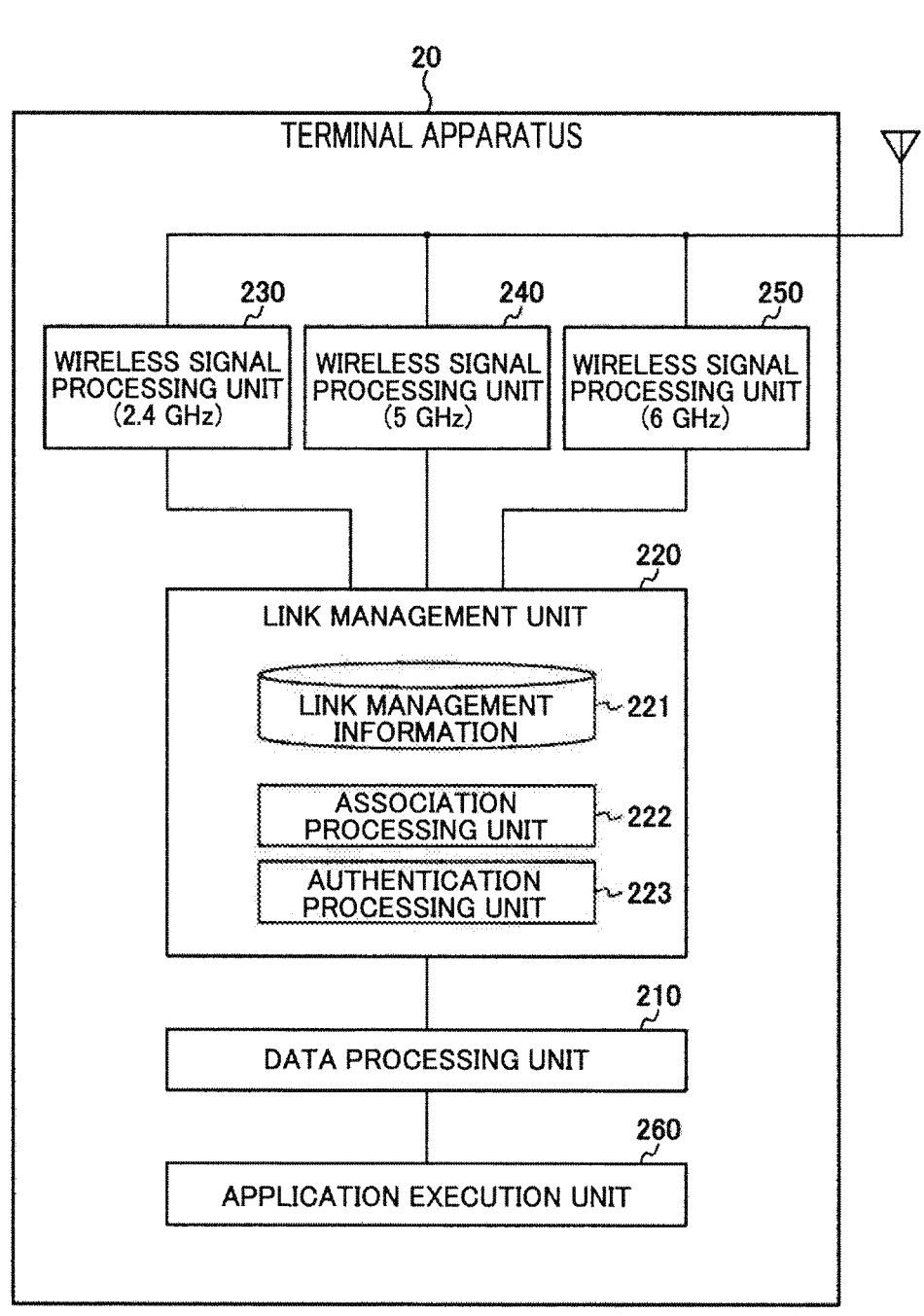
FIG. 6 is a block diagram showing an example of functions of the terminal apparatus included in the wireless system according to the first embodiment.

FIG. 6 shows an example of the functional configuration of the terminal apparatus 20 in the wireless system 1 according to the first embodiment. As shown in FIG. 6, the terminal apparatus 20 can function as, for example, a data processing unit 210, a link management unit 220, wireless signal processing units 230, 240, and 250, and an application execution unit 260.

The data processing unit 210 can execute the processing of the LLC layer and the processing of the upper layer on the input data. For example, the data processing unit 210 outputs the data input from the application execution unit 260 to the link management unit 220. Also, the data processing unit 210 outputs the data input from the link management unit 220 to the application execution unit 260.

The link management unit 220 can execute, for example, some of the processing of the MAC layer on the input data. Also, the link management unit 220 manages the link with the base station 10 based on notifications from the wireless signal processing units 230, 240, and 250. The link management unit 220 includes link management information 221. The link management information 221 is stored in, for example, the RAM 23, and includes information on the base station 10 to which the terminal apparatus 20 is connected. The link management information 221 includes information similar to, for example, the link management information 121.

Also, the link management unit 220 includes an association processing unit 222 and an authentication processing unit 223. When the association processing unit 222 receives the connection request of the base station 10 via one of the wireless signal processing units 230, 240, and 250, the association processing unit 222 executes a protocol related to association. The authentication processing unit 223 executes a protocol related to authentication following the connection request.

Each of the wireless signal processing units 230, 240, and 250 can execute, for example, some of the processing of the MAC layer and the processing of the first layer on the input data or the wireless signal. That is, each of the wireless signal processing units 230, 240, and 250 performs transmission and reception of data between the base station 10 and the terminal apparatus 20 using wireless communication. The wireless signal processing unit 230 handles wireless signals in the 2.4 GHz band. The wireless signal processing unit 240 handles wireless signals in the 5 GHz band. The wireless signal processing unit 250 handles wireless signals in the 6 GHz band. The wireless signal processing units 230, 240, and 250 may or may not share the antenna of the terminal apparatus 20.

For example, each of the wireless signal processing units 230, 240, and 250 creates a wireless frame using the data input from the link management unit 220. Then, each of the wireless signal processing units 230, 240, and 250 converts the wireless frame into a wireless signal and distributes the wireless signal via the antenna of the terminal apparatus 20. Also, each of the wireless signal processing units 230, 240, and 250 converts the wireless signal received via the antenna of the terminal apparatus 20 into a wireless frame, and outputs the data included in the wireless frame to the link management unit 220.

The application execution unit 260 executes an application that can use the data input from the data processing unit 210. For example, the application execution unit 260 can display information on the application on the display 25. Also, the application execution unit 260 can operate based on operation of the input interface.

In the functional configuration of the wireless system 1 according to the first embodiment described above, the wireless signal processing units 130, 140, and 150 of the base station 10 are configured to be able to connect to the wireless signal processing units 230, 240, and 250 of the terminal apparatus 20, respectively. Specifically, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. Each wireless signal processing unit may be referred to as an "STA function". That is, the wireless system 1 according to the first embodiment includes a plurality of STA functions.

<1-2-3> Details of Multi-Link Processing

Figure 7:
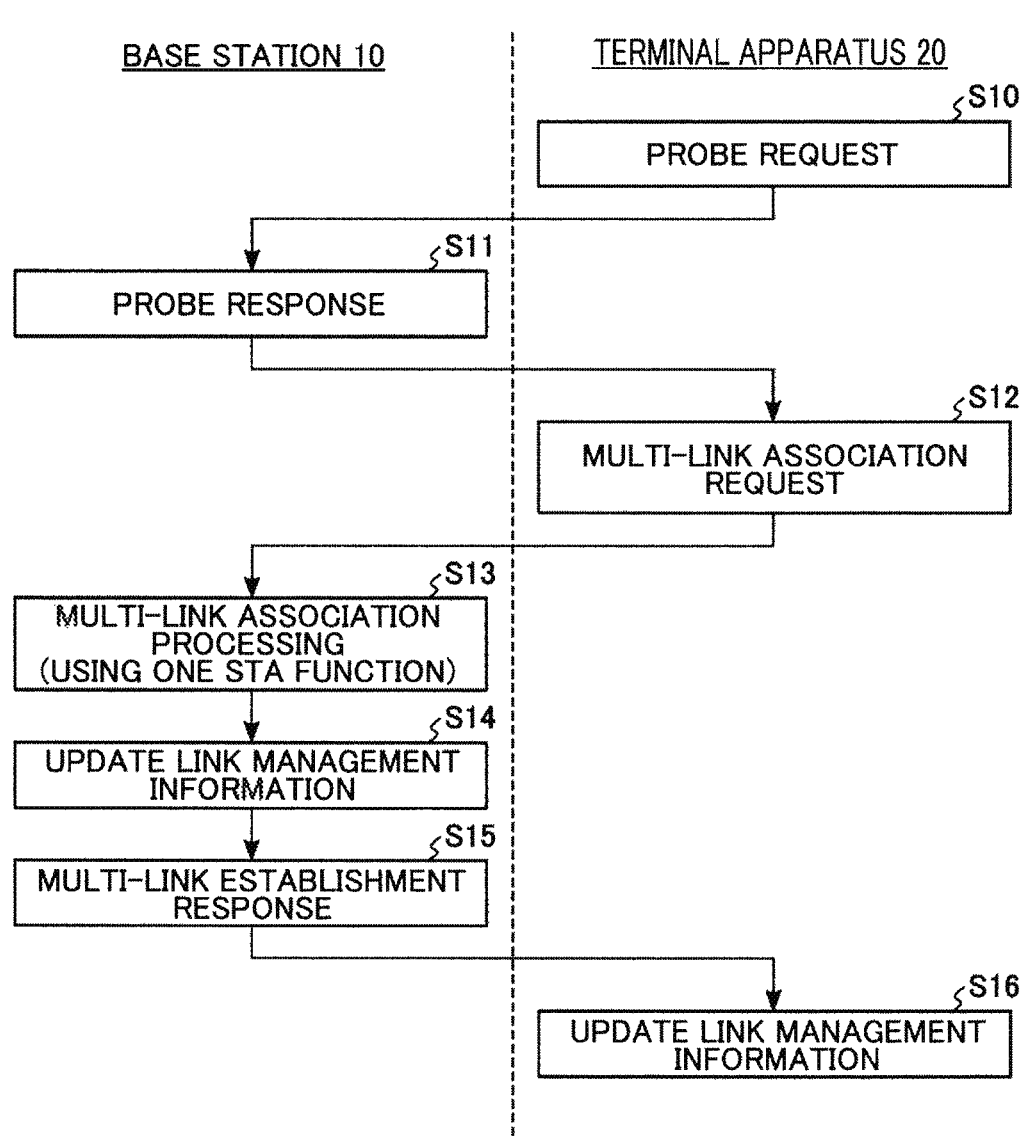
FIG. 7 is a flowchart showing an example of multi-link processing in the wireless system according to the first embodiment.

Next, an example of a flow of the multi-link processing in the wireless system 1 according to the first embodiment will be described. FIG. 7 is a flowchart showing an example of multi-link processing in the wireless system 1 according to the first embodiment. As shown in FIG. 7, in the multi-link processing in the first embodiment, for example, the processing of steps S10 to S16 is executed sequentially.

Specifically, first, in the processing of step S10, the terminal apparatus 20 transmits a probe request to the base station 10. The probe request is a signal for confirming whether or not the base station 10 is present in the surrounding area of the terminal apparatus 20. Note that the terminal apparatus 20 may transmit a probe request for the purpose of searching for whether or not there is a base station in the vicinity without necessarily assuming the presence of a specific base station 10. The Frame Control field of the probe request includes, for example, "00/0100 (Type value/Subtype value)". Upon receiving the probe request, the base station 10 executes the processing of step S11.

In the processing of step S11, the base station 10 transmits a probe response to the terminal apparatus 20. The probe response is a signal used by the base station 10 to respond to a probe request from the terminal apparatus 20. The Frame Control field of the probe response includes, for example, "00/0101 (Type value/Subtype value)". Upon receiving the probe request, the terminal apparatus 20 executes the processing of step S12.

In the processing of step S12, the terminal apparatus 20 transmits a multi-link association request to the base station 10 via at least one STA function. The multi-link association request is a signal for requesting the base station 10 to establish a multi-link. Note that a multi-link association request obtained by adding information for multi-link connection to a normal association request may be used as the multi-link association request. For example, the multi-link association request is generated by the link management unit 220 of the terminal apparatus 20. The Frame Control field of the multi-association request includes, for example, "00/xxxx (Type value/Subtype value (xxxx is a predetermined numeric value))". Upon receiving the multi-link association request, the link management unit 120 of the base station 10 executes the processing of step S13.

In the processing of step S13, the link management unit 120 of the base station 10 executes the multi-link association processing using one STA function. Specifically, first, the base station 10 executes the association processing of the first STA function with the terminal apparatus 20. Then, when the wireless connection (link) is established in the first STA function, the link management unit 120 of the base station 10 uses the first STA function for which the link is established to execute association processing of a second STA function. That is, the STA function for which the link is established is used for association processing of an STA function with no established link. When the association processing of at least two STA functions is completed, the base station 10 establishes the multi-link and executes the processing of step S14.

In the processing of step S14, the link management unit 120 of the base station 10 updates the link management information 121. Note that in this example, the processing of step S14 is executed after two links are established, but the link management information 121 may be updated each time the link state is updated, or may be updated when the multi-link is established. When the multi-link is established and the link management information is updated, the base station 10 executes the processing of step S15.

In the processing of step S15, the base station 10 transmits a multi-link establishment response to the terminal apparatus 20. The multi-link establishment response is a signal used by the base station 10 to respond to a multi-link request from the terminal apparatus 20. The Frame Control field of the multi-association request includes, for example, "00/0001 (Type value/Subtype value)". The link management unit 220 of the terminal apparatus 20 recognizes that the multi-link with the base station 10 has been established based on the fact that the multi-link establishment response was received. Upon receiving the multi-link establishment response, the terminal apparatus 20 executes the processing of step S16.

In the processing of step S16, the link management unit 220 of the terminal apparatus 20 updates the link management information 221. That is, the terminal apparatus 20 records the fact that the multi-link with the base station 10 has been established in the link management information 221. As a result, the multi-link processing in the wireless system 1 according to the first embodiment is complete, and data communication using the multi-link becomes possible between the base station 10 and the terminal apparatus 20.

FIG. 8 shows an example of the link management information 121 in the wireless system 1 according to the first embodiment. As shown in FIG. 8, the link management information 121 includes, for example, information on the STA function, frequency, link destination ID, presence/absence of a multi-link, and traffic ID (TID). The link destination ID in the link management information 121 corresponds to, for example, the identifier of the terminal apparatus 20. On the other hand, the link destination ID in the link management information 221 corresponds to, for example, the identifier of the base station 10. In this example, "STA1" corresponds to the STA function that uses the 6 GHz frequency band. "STA2" corresponds to the STA function that uses the 5 GHz frequency band. "STA3" corresponds to the STA function that uses the 2.4 GHz frequency band.

Also, in this example, a multi-link using "STA1" and "STA2" has been established. When the multi-link is established, each of the link management units 120 and 220 transmits the data input from the upper layer using the link of at least one STA function associated with the multi-link. The link management units 120 and 220 may associate the traffic and the STA function with each other based on the type of traffic.

For example, the link management unit 220 of the terminal apparatus 20 determines the association between the traffic and the STA function, and sends a request to the link management unit 120 of the base station 10. Then, the base station 10 confirms the association between the traffic and the STA function by responding to the request. Also, one STA function may be associated with one type of traffic, or a plurality of STA functions may be associated with one type of traffic. In this example, "STA1" is associated with "TID #1" and "TID #2". "STA2" is associated with "TID #1" and "TID #3".

In this manner, when a plurality of STA functions are associated with one type of traffic, data is transmitted in parallel by the plurality of STA functions. When one type of traffic is transmitted in parallel, it is necessary to distribute and sort the data between the link management unit 120 of the base station 10 and the link management unit 220 of the terminal apparatus 20. The distribution of the data is executed by the link management unit on the transmitting side, and the link management unit on the transmitting side adds a flag indicating the multi-link and an identification number to the wireless frame. The sorting of the data is executed by the link management unit on the receiving side.

\<1-3\> Effect of First Embodiment

With the wireless system 1 according to the first embodiment described above, a multi-link between the terminal apparatus 20 and the base station 10 can be established based on the request from the terminal apparatus 20. Detailed effects of the wireless system 1 according to the first embodiment will be described hereinafter.

Base stations and terminal apparatuses that use a wireless LAN include a plurality of STA functions provided for each band used, for example, 2.4 GHz, 5 GHz, and 6 GHz, in some cases. In such a wireless system, for example, by selecting one STA function among a plurality of STA functions, a wireless connection is established and data communication between the base station and the terminal apparatus is performed. At this time, in the wireless system, the unselected STA function is not used even if there is a base station corresponding to the band of the STA function.

In contrast to this, the wireless system 1 according to the first embodiment utilizes a plurality of STA functions provided in each of the base station 10 and the terminal apparatus 20 to establish a multi-link between the base station 10 and the terminal apparatus 20. Stated briefly, the base station 10 includes a link management unit 120, and the terminal apparatus 20 has a link management unit 220. Also, the link management unit 220 of the terminal apparatus 20 transmits a multi-link aggregation request to the base station 10, and the link management unit 120 of the base station 10 establishes a multi-link based on the received multi-link aggregation request.

As described above, the multi-link in the wireless system 1 according to the first embodiment is established due to the terminal apparatus 20 designating the multi-link to the base station 10 from the beginning. In data communication through a multi-link, a plurality of bands can be used together, and the functions of the wireless LAN device can be fully utilized. As a result, the wireless system 1 according to the first embodiment can realize efficient communication and can improve the communication speed.

Note that the wireless system 1 according to the first embodiment can continue communication using another STA function even if the connection through one STA function is canceled in the multi-link state. Furthermore, the wireless system 1 according to the first embodiment can also use a multi-link to communicate between the link management unit 120 of the base station 10 and the link management unit 220 of the terminal apparatus 20 while performing link aggregation processing and switching. As a result, the wireless system 1 according to the first embodiment can also improve the communication stability.

Also, in the wireless system 1 according to the first embodiment, the association processing of each STA function is executed by the link management unit 120 of the base station 10 and the link management unit 220 of the terminal apparatus 20. Then, the establishment of the link by the plurality of STA functions is executed using one STA function. As a result, in the wireless system 1 according to the first embodiment, the association processing unit for each wireless signal processing unit can be omitted, and the configuration of each wireless signal processing unit can be simplified.

\<1-4\> Modified Example of First Embodiment

The method of multi-link processing described in the first embodiment is merely an example. Multi-link processing in the wireless system 1 according to a modified example of the first embodiment will be described hereinafter.

Figure 9:
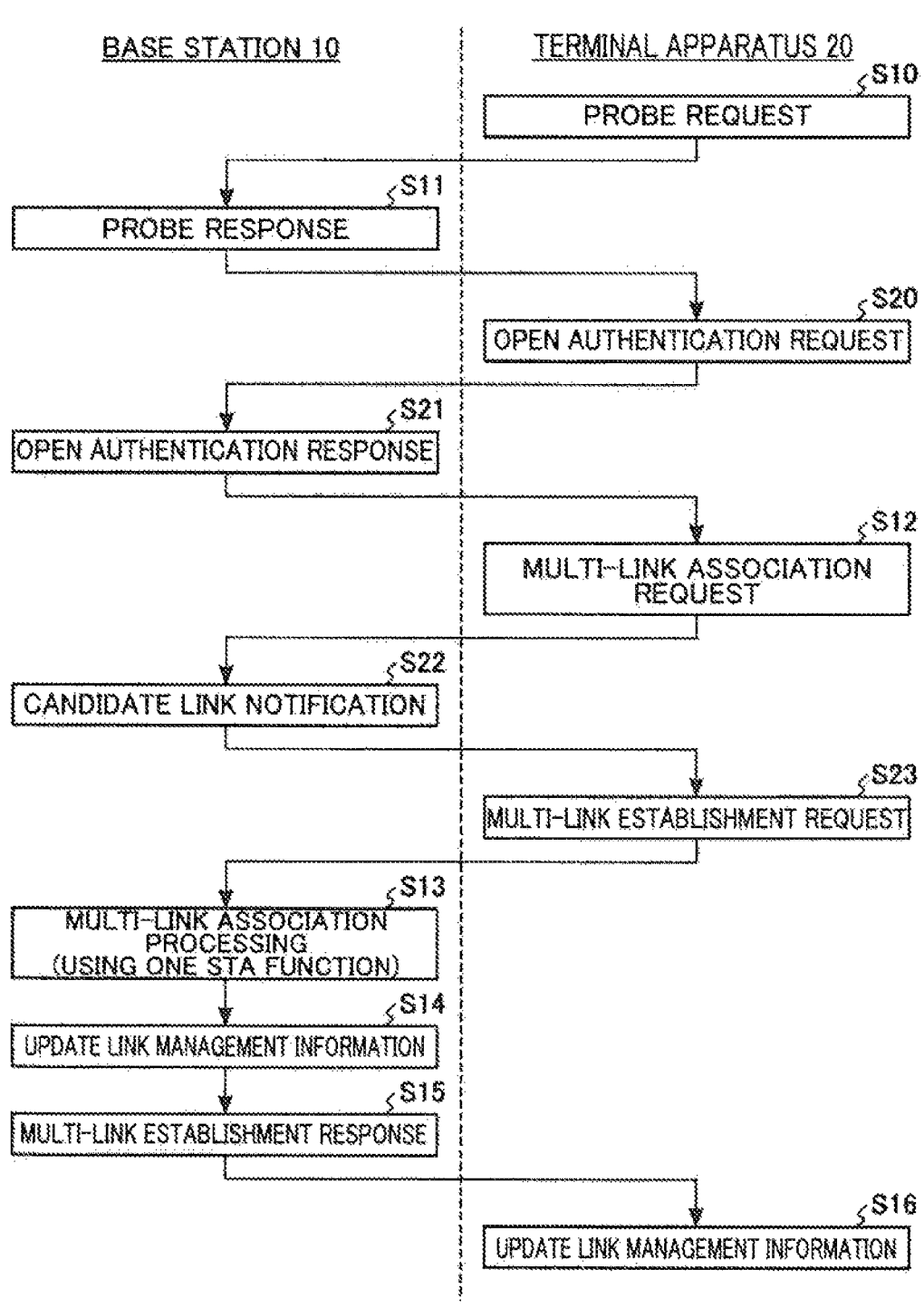
FIG. 9 is a flowchart showing an example of multi-link processing in a wireless system according to a modified example of the first embodiment.

FIG. 9 is a flowchart showing an example of multi-link processing in the wireless system 1 according to the modified example of the first embodiment. As shown in FIG. 9, in the multi-link processing in the modified example of the first embodiment, processing in which processing of steps S20 and S21 is inserted between steps S11 and S12 and processing of steps S22 and S23 is inserted between steps S12 and S13 in the multi-link processing described in the first embodiment is executed.

Specifically, first, similarly to the first embodiment, the processing of steps S10 to S12 is executed sequentially. Stated simply, the terminal apparatus 20 transmits a probe request to the base station 10 (step S10). The base station 10 transmits a probe response to the terminal apparatus 20 in response to the probe request (step S11). In the modified example of the first embodiment, when the terminal apparatus 20 receives the probe response, the processing of step S20 is executed.

In the processing of step S20, the terminal apparatus 20 transmits an open authentication request to the base station 10. The open authentication request is a signal for the terminal apparatus 20 to request authentication from the base station 10. Upon receiving the open authentication request, the base station 10 executes authentication processing with the terminal apparatus 20. The authentication processing is executed between the authentication processing unit 123 of the base station 10 and the authentication processing unit 223 of the terminal apparatus 20. When the authentication processing is complete, the base station 10 executes the processing of step S21.

In the processing of step S21, the base station 10 transmits an open authentication response to the terminal apparatus 20. The open authentication response is a signal notifying that the authentication processing based on the open authentication request is complete. Upon receiving the open authentication response, the terminal apparatus 20 transmits a multi-link association request to the base station 10, similarly to the first embodiment (step S12). In the modified example of the first embodiment, when the base station 10 receives the multi-link association request, the processing of step S22 is executed.

In the processing of step S22, the base station 10 notifies the terminal apparatus 20 of a candidate link. The candidate link includes information on the channels that the base station 10 can use for a multi-link with the terminal apparatus 20. Upon receiving the candidate link, the terminal apparatus 20 executes the processing of step S23.

In the processing of step S23, the terminal apparatus 20 transmits a multi-link establishment request to the base station 10. The multi-link establishment request is generated by the link management unit 220 that received the candidate link. Specifically, the link management unit 220 selects at least two channels to be used for the multi-link from the candidate link. Alternatively, the link management unit 220 agrees to use a plurality of channels included in the candidate link. Then, the link management unit 220 inserts information of the selected band or information indicating that the candidate link is agreed to into the multi-link establishment request, and transmits the result to the base station 10 via the STA function. Upon receiving the multi-link establishment request, the base station 10 executes the processing of step S13.

In the processing of step S13, the base station 10 executes the multi-link association processing using the STA function corresponding to the channel included in the multi-link establishment request. Alternatively, the base station 10 executes multi-link association processing using the STA function corresponding to the channel included in the candidate link based on the "information indicating that the candidate link has been agreed to" included in the multi-link establishment request. Other operations of the multi-link processing in the wireless system 1 according to the modified example of the first embodiment are the same as those of the first embodiment.

As described above, the wireless system 1 according to the modified example of the first embodiment executes the authentication processing, the notification of the candidate link, and the like at the time of the multi-link processing. Various options may be applied to the multi-link processing, and the option to be used can be selected as appropriate. Even in such a case, the wireless system 1 according to the modified example of the first embodiment can establish a multi-link similarly to the first embodiment, and can obtain the same effect as in the first embodiment.

<2> Second Embodiment

The wireless system 1 according to the second embodiment executes the association processing for each STA function, and establishes the same multi-link as in the first embodiment. Points in which the wireless system 1 according to the second embodiment differs from the first embodiment will be described hereinafter.

<2-1> Functions of Wireless System 1

Figure 10:
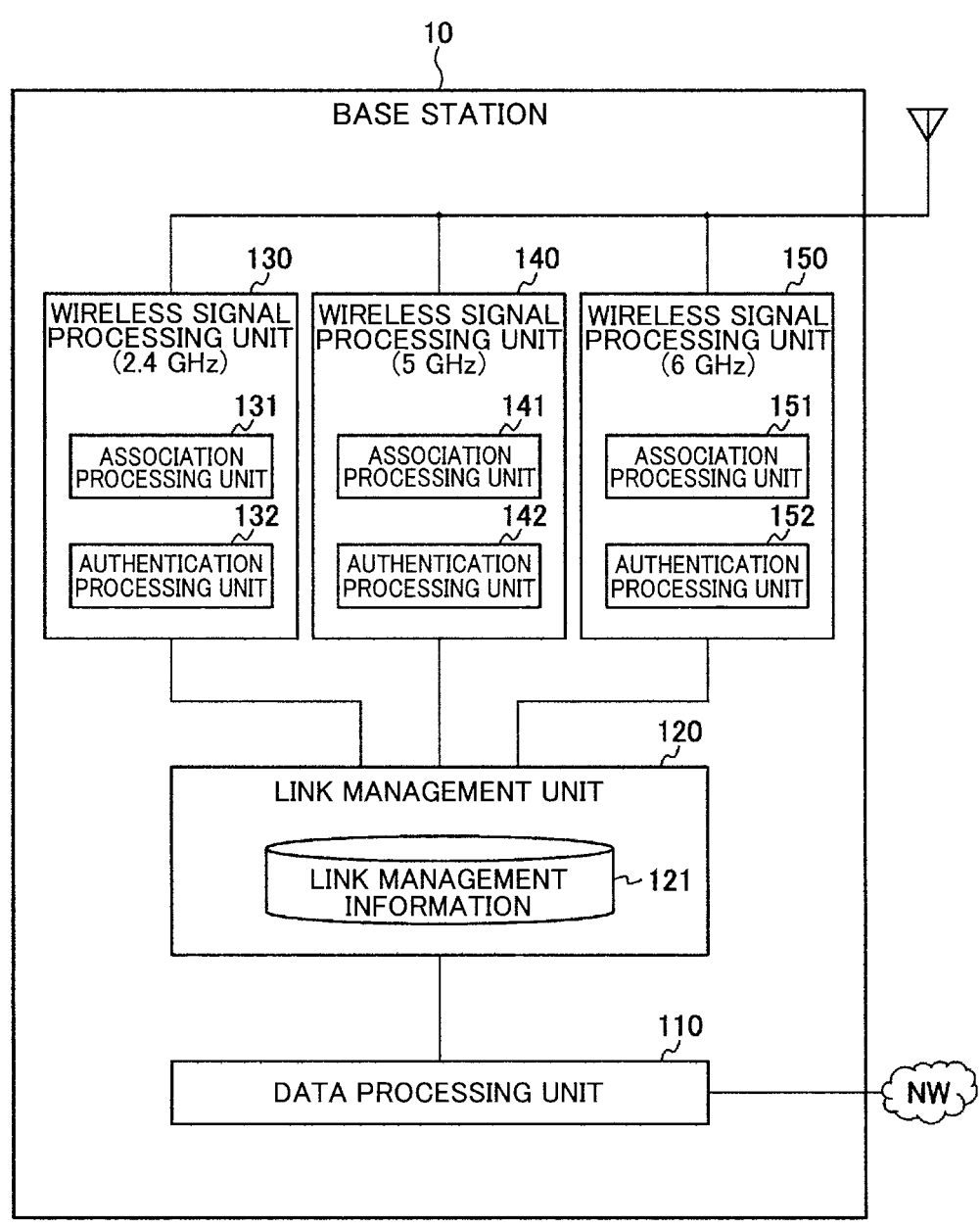
FIG. 10 is a block diagram showing an example of functions of a base station included in a wireless system according to a second embodiment.

FIG. 10 shows an example of a functional configuration of a base station 10 in the wireless system 1 according to the second embodiment. As shown in FIG. 10, in the base station 10 in the second embodiment, the configurations of the link management unit 120 and the wireless signal processing units 130, 140, and 150 differ from those of the base station 10 in the first embodiment.

Specifically, in the base station 10 in the second embodiment, the association processing unit 122 and the authentication processing unit 123 of the link management unit 120 are omitted. Also, the wireless signal processing unit 130 includes the association processing unit 131 and the authentication processing unit 132, the wireless signal processing unit 140 includes the association processing unit 141 and the authentication processing unit 142, and the wireless signal processing unit 150 includes the association processing unit 151 and the authentication processing unit 152.

Each of the association processing units 131, 141, and 151 has the same function as the association processing unit 122. Each of the authentication processing units 132, 142, and 152 has the same function as the authentication processing unit 123. That is, the association processing unit and the authentication processing unit of the base station 10 are provided in the link management unit 120 in the first embodiment, whereas the association processing unit and the authentication processing unit of the base station 10 are provided in each of the wireless signal processing units 130, 140, and 150 in the second embodiment. Other configurations of the base station 10 in the second embodiment are the same as those in the first embodiment.

Figure 11:
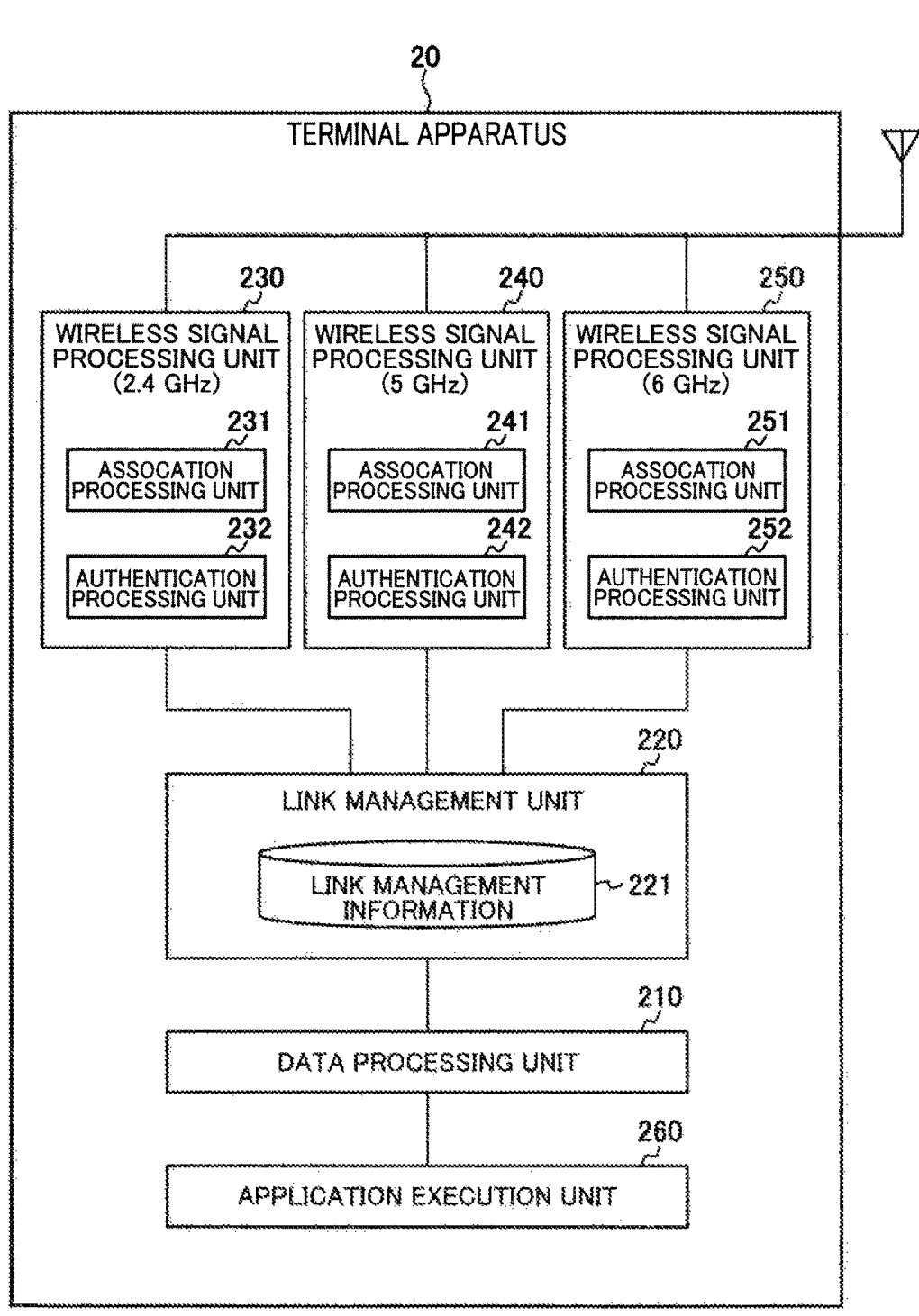
FIG. 11 is a block diagram showing an example of functions of a terminal apparatus included in the wireless system according to the second embodiment.

FIG. 11 shows an example of a functional configuration of the terminal apparatus 20 in the wireless system 1 according to the second embodiment. As shown in FIG. 11, in the terminal apparatus 20 in the second embodiment, the configurations of the link management unit 220 and the wireless signal processing units 230, 240, and 250 differ from those of the terminal apparatus 20 in the first embodiment.

Specifically, in the terminal apparatus 20 of the second embodiment, the association processing unit 222 and the authentication processing unit 223 of the link management unit 220 are omitted. Also, the wireless signal processing unit 230 includes the association processing unit 231 and the authentication processing unit 232, the wireless signal processing unit 240 includes the association processing unit 241 and the authentication processing unit 242, and the wireless signal processing unit 250 includes the association processing unit 251 and the authentication processing unit 252.

Each of the association processing units 231, 241, and 251 has the same function as the association processing unit 222. Each of the authentication processing units 232, 242 and 252 has the same function as the authentication processing unit 223. That is, the association processing unit and the authentication processing unit of the terminal apparatus 20 are provided in the link management unit 220 in the first embodiment, whereas the association processing unit and the authentication processing unit of the terminal apparatus 20 are provided in each of the wireless signal processing units 230, 240, and 250 in the second embodiment. Other configurations of the terminal apparatus 20 in the second embodiment are the same as those in the first embodiment.

<2-2> Multi-Link Processing

Figure 12:
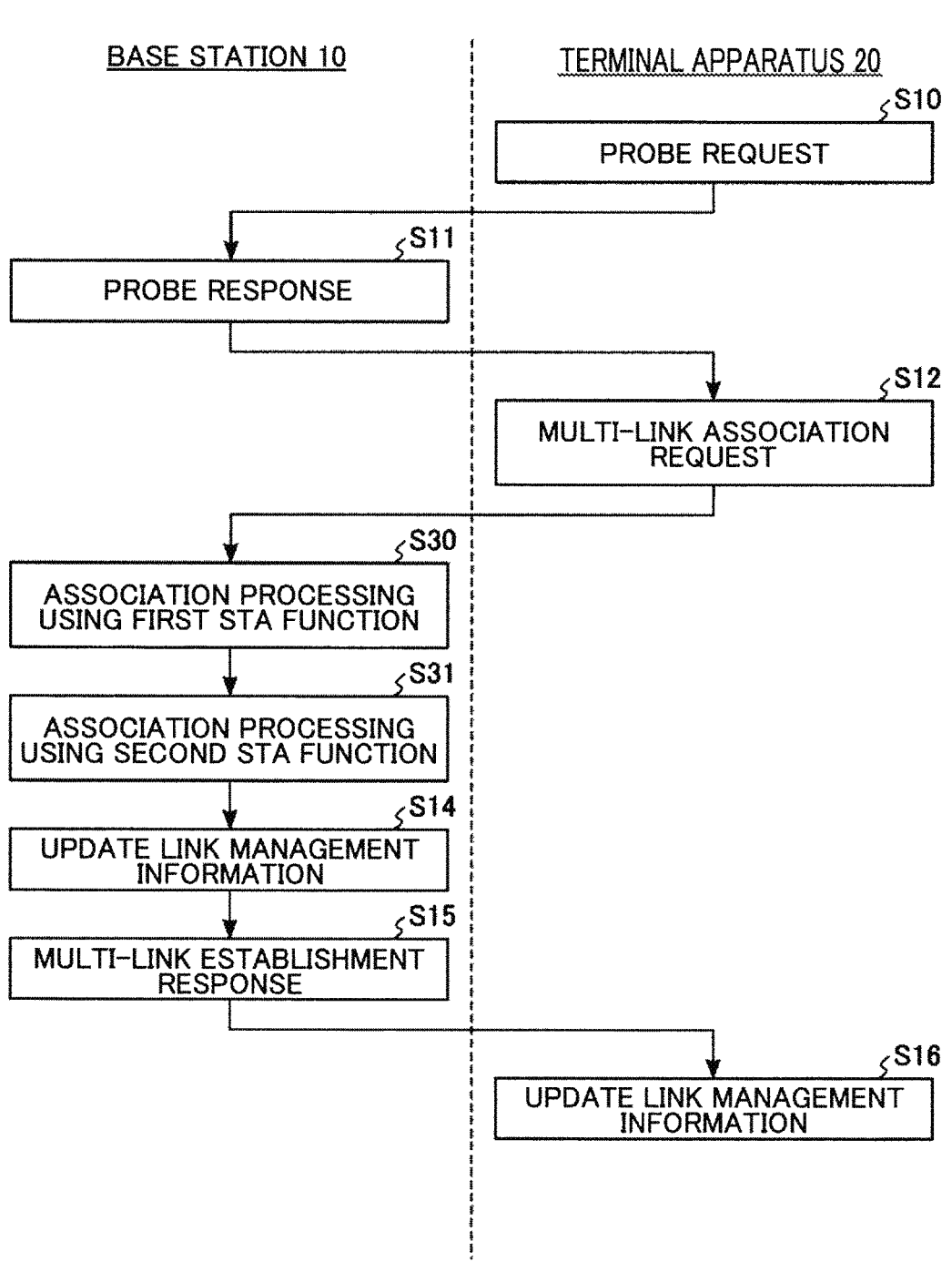
FIG. 12 is a flowchart showing an example of multi-link processing in the wireless system according to the second embodiment.

An example of a flow of multi-link processing in the wireless system 1 according to the second embodiment will be described hereinafter. FIG. 12 is a flowchart showing an example of multi-link processing in the wireless system 1 according to the second embodiment. As shown in FIG. 12, in the multi-link processing in the second embodiment, processing in which step S13 is replaced with steps S30 and S31 in the multi-link processing described in the first embodiment is executed.

Specifically, first, similarly to the first embodiment, the processing of steps S10 to S12 is executed sequentially. Stated simply, the terminal apparatus 20 transmits a probe request to the base station 10 (step S10). The base station 10 transmits a probe response to the terminal apparatus 20 in response to the probe request (step S11). The terminal apparatus 20 transmits a multi-link association request to the base station 10 in response to the probe response (step S12).

Upon receiving the multi-link association request, the base station 10 executes the multi-link association processing. In the multi-link association processing in the second embodiment, in the association processing of the first link, the link that is to be the target of the multi-link is adjusted (e.g., the STA function to be used for the multi-link is selected). For example, the link management unit 120 of the base station 10 notifies the link management unit 220 of the terminal apparatus 20 of a plurality of candidate links that can be used for the multi-link. The link management unit 220 of the terminal apparatus 20 selects a candidate link to be used for the multi-link from the plurality of notified candidate links, and notifies the link management unit 120 of the base station 10. Due to the base station 10 agreeing to this notification, the link that is to be the target of the multi-link is adjusted. Notification of a plurality of candidate links and notification of the selected candidate link between the base station 10 and the terminal apparatus 20 are performed using a probe request and a probe response, respectively. Then, the link management unit 120 of the base station 10 instructs execution of the association processing to at least two STA functions used for the multi-link. Note that the execution instruction of these association processes may also be processed by the link management unit 220 of the terminal apparatus 20. Each STA function starts the association processing based on the instruction of the link management unit 120, and when the link is established, notifies the link management unit 120 of the establishment of the link.

Here, an example of multi-link association processing in the case where the first STA function corresponds to the wireless signal processing unit 150 and the second STA function corresponds to the wireless signal processing unit 140 will be described.

Upon receiving the multi-link association request, the link management unit 120 of the base station 10 first instructs the wireless signal processing unit 150 (first STA function) to execute the association processing (step S30). Then, the wireless signal processing unit 150 uses the association processing unit 151 to execute the association processing with the wireless signal processing unit 250 of the terminal apparatus 20. When the link performed by the first STA function is established, the wireless signal processing unit 150 notifies the link management unit 120 of the establishment of the link.

On the other hand, the link management unit 120 of the base station 10 instructs the wireless signal processing unit 140 (second STA function) to execute the association processing (step S31). Then, the wireless signal processing unit 140 executes the association processing with the wireless signal processing unit 240 of the terminal apparatus 20 using the association processing unit 141. When the link by the second STA function is established, the wireless signal processing unit 140 notifies the link management unit 120 of the establishment of the link. Note that the establishment of each link may be executed serially or in parallel. A common AID (association identifier) is used in the association process for establishing each link. The AID is an identifier for uniquely identifying the communication partner used in the association.

When the processing of steps S30 and S31 is complete and the link by at least two STA functions is established, the base station 10 updates the link management information 121 (step S14). Other operations of the multi-link processing in the wireless system 1 according to the second embodiment are the same as those in the first embodiment.

<2-3> Effect of the Second Embodiment

With the wireless system 1 according to the second embodiment described above, the multi-link can be established based on the request of the terminal apparatus 20, similarly to the first embodiment. Also, the wireless system 1 according to the second embodiment can obtain the same effect as that of the first embodiment.

Also, in the wireless system 1 according to the second embodiment, the association processing is executed by each STA function (wireless signal processing unit). For this reason, in the wireless system 1 according to the second embodiment, the wireless signal processing units 130, 140, 150, 230, 240, and 250 can be constituted by the same wireless modules as in a terminal apparatus or a base station that does not include the link management unit. As a result, the wireless system 1 according to the second embodiment can suppress the development cost of the base station 10 and the terminal apparatus 20.

<3> Third Embodiment

The wireless system 1 according to the third embodiment has, for example, the same configuration as that of the first embodiment. Also, the wireless system 1 according to the third embodiment establishes the same multi-link as the first embodiment using a plurality of channels included in the same frequency band. Points in which the wireless system 1 according to the third embodiment differs from the first and second embodiments will be described hereinafter.

<3-1> Band Used for Wireless Communication

Figure 13:
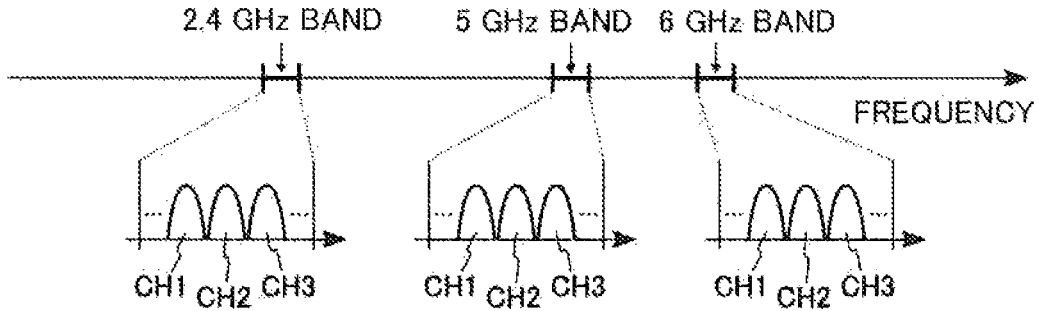
FIG. 13 is a conceptual diagram showing an example of frequency bands used for wireless communication in a wireless system according to a third embodiment.

FIG. 13 shows an example of a frequency band used for wireless communication in the wireless system 1 according to the third embodiment. As shown in FIG. 13, in wireless communication, for example, the 2.4 GHz band, the 5 GHz band, and the 6 GHz band are used. Each frequency band includes a plurality of channels. In this example, it is assumed that each of the 2.4 GHz band, 5 GHz band, and 6 GHz band includes at least three channels CH1, CH2, and CH3. Communication using each channel CH is realized by the associated STA function.

<3-2> Multi-Link Processing

The wireless system 1 according to the third embodiment establishes the same multi-link as in the first embodiment using a plurality of channels CH included in the same frequency band. The multi-link processing in the third embodiment is the same as the multi-link processing described in the first embodiment in which the channel used for the multi-link is changed to a plurality of channels CH included in the same frequency band.

FIG. 14 shows an example of the link management information 121 in the wireless system 1 according to the third embodiment. As shown in FIG. 14, the link management information 121 in the third embodiment has a configuration in which information related to the channel ID for each frequency band is added to the link management information 121 in the first embodiment. Also, in this example, the same multi-link as in the first embodiment is established using the channel CH2 of "STA1" corresponding to the 6 GHz frequency band and the channel CH3 of "STA2" corresponding to the 6 GHz frequency band.

<3-3> Effect of Third Embodiment

As described above, the same frequency band may be used for each STA function of the base station 10 and the terminal apparatus 20. Also, the multi-link between the base station 10 and the terminal apparatus 20 may be established by a plurality of STA functions using the same frequency band. Specifically, a plurality of STA functions may form a multi-link using, for example, different channels CH in the 5 GHz band. Even in such a case, the wireless system 1 according to the third embodiment can realize efficient communication and improve communication stability, similarly to the first embodiment.

<4> Fourth Embodiment

The wireless system 1 according to the fourth embodiment has, for example, the same configuration as that of the first embodiment. Also, in the wireless system 1 according to the fourth embodiment, the terminal apparatus 20 determines whether or not the multi-link is possible based on a beacon signal distributed by the base station 10. Hereinafter, points in which the wireless system 1 according to the fourth embodiment differs from the first to third embodiments will be described.

<4-1> Beacon Signal

In the wireless system 1 according to the fourth embodiment, the base station 10 broadcasts information on a channel that can be used for a multi-link in advance using a beacon signal. This beacon information is generated by, for example, the link management unit 120. The Frame Control field of the beacon signal includes, for example, "00/1000 (Type value/Subtype value)". The link management unit 120 updates the information to be inserted into the beacon signal according to the state of the base station 10, as appropriate.

Figure 15:
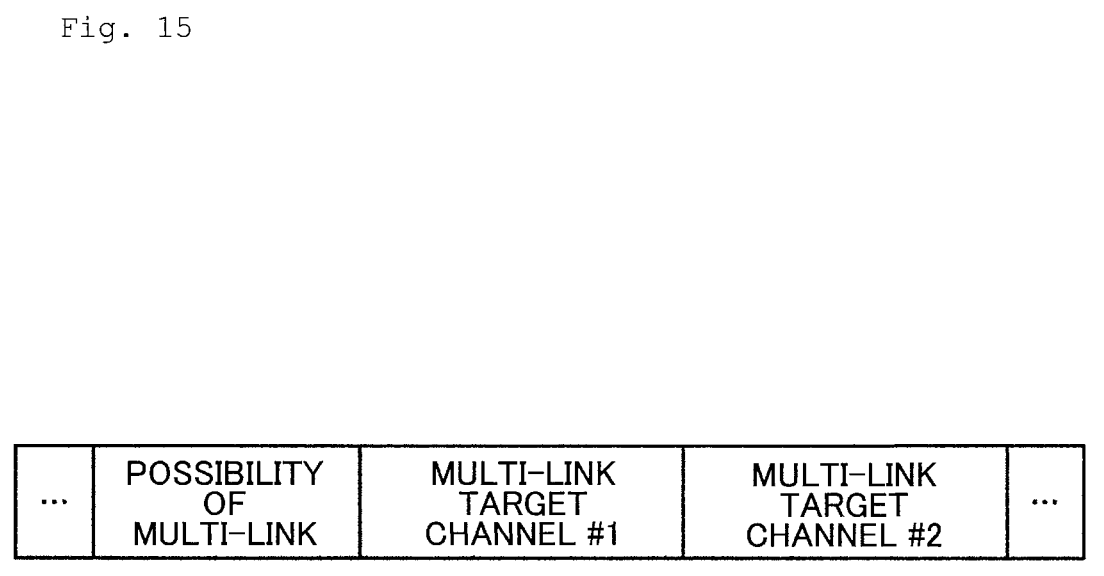

FIG. 15 shows a specific example of the format of the beacon signal in the wireless system 1 according to the fourth embodiment. As shown in FIG. 15, the beacon signal includes, for example, information indicating whether or not a multi-link is possible, information (#1) on the first multi-link target channel, and information (#2) on the second multi-link target channel. The information indicating whether or not a multi-link is possible indicates whether or not a multi-link using the base station 10 is possible. If a multi-link is possible in the base station 10, the beacon signal includes at least two pieces of information on the multi-link target channel.

<4-2> Multi-Link Processing

Figure 16:
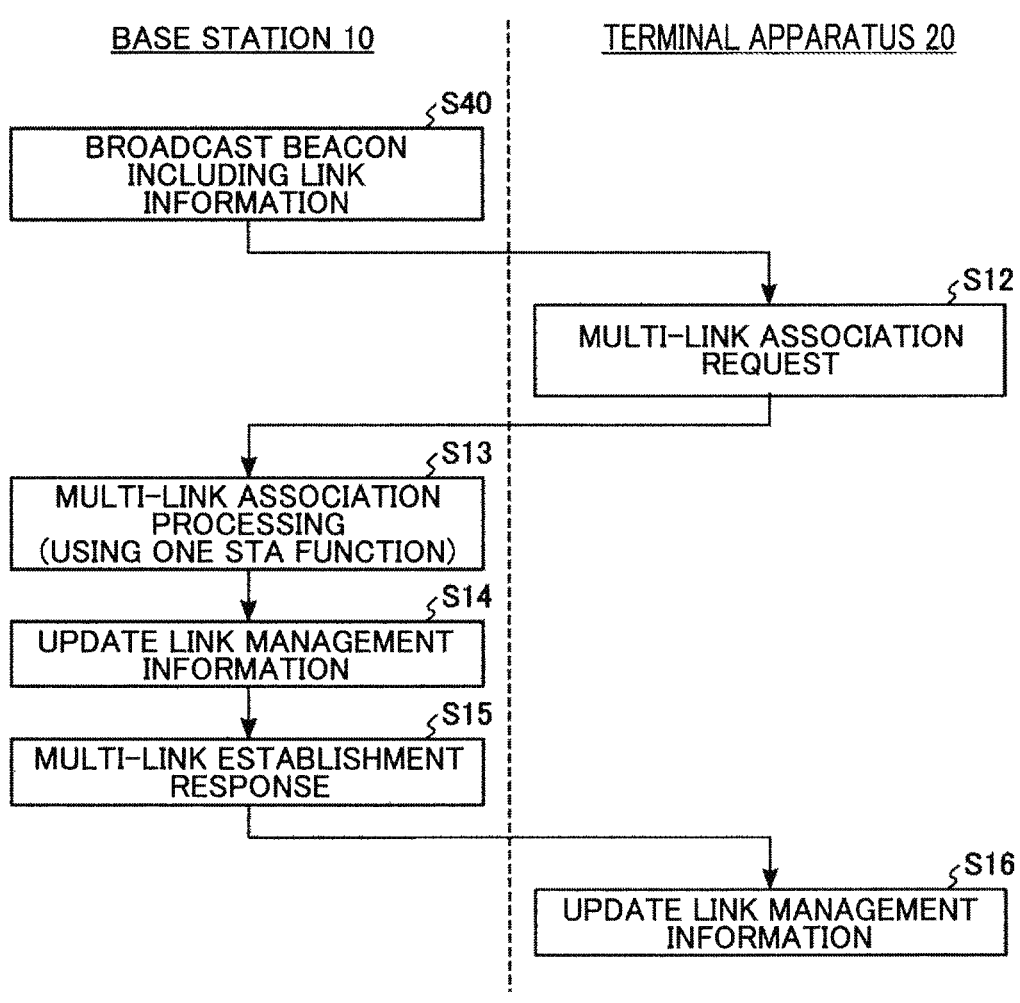
FIG. 16 is a flowchart showing an example of multi-link processing in the wireless system according to the fourth embodiment.

FIG. 16 is a flowchart showing an example of operations of the wireless system 1 according to the fourth embodiment. As shown in FIG. 16, in the multi-link processing in the fourth embodiment, processing in which steps S10 and S11 are omitted and step S40 is added in the multi-link processing described in the first embodiment is executed.

Specifically, first, in the processing of step S40, the base station 10 broadcasts a beacon including the link information. This link information includes information indicating whether or not a multi-link is possible and information on a plurality of multi-link target channels. When the terminal apparatus 20 receives the beacon signal including the link information, the link management unit 220 of the terminal apparatus 20 can keep track of the information on the base station 10 in which a multi-link is possible and the information on the channel used in the multi-link. That is, the link management unit 220 of the terminal apparatus 20 can acquire whether or not there is a multi-link compatible access point and the information on the multi-link target channel by receiving the beacon signal.

Then, the link management unit 220 of the terminal apparatus 20 requests the base station 10 to establish the multi-link via any one of the multi-link target channels. In other words, the link management unit 220 of the terminal apparatus 20 transmits a multi-link association request to the base station 10 wishing to establish a multi-link based on the link information notified from one or more STA functions (step S12). Other operations of the multi-link processing in the fourth embodiment are the same as those in the first embodiment.

Note that the wireless system 1 may also execute the processing of steps S10 and S11 described in the first embodiment before step S12. Specifically, after the beacon including the link information is broadcast, the terminal apparatus 20 that receives the beacon may transmit a probe request to the base station 10 (step S10), and the base station 10 may transmit a probe response to the terminal apparatus 20 in response to the probe request (step S11). In this example, the terminal apparatus 20 thereafter transmits a multi-link association request to the base station 10 (step S12).

<4-3> Effect of Fourth Embodiment

As described above, in the wireless system 1 according to the fourth embodiment, the base station 10 distributes a beacon signal including information indicating whether or not a multi-link is possible and information on a channel that is to be a multi-link target that is desired in advance. Also, the terminal apparatus 20 establishes a multi-link with the base station 10 via the STA function that supports the channel included in the beacon signal (link information).

As a result, in the wireless system 1 according to the fourth embodiment, the base station 10 can establish the multi-link by merely responding to the multi-link association request from the terminal apparatus 20. Accordingly, the wireless system 1 according to the fourth embodiment can establish a multi-link between the base station 10 and the terminal apparatus 20 more easily than in the first embodiment, and can improve convenience for the user.

<5> Fifth Embodiment

A fifth embodiment relates to a variation of a method for implementing a specific association setup in the wireless system 1 described in the first embodiment. Hereinafter, points in which the wireless system 1 according to the fifth embodiment differs from the first to fourth embodiments will be described.

<5-1> Multi-Link Processing

In the wireless system 1, the base station 10 and the terminal apparatus 20 may exchange information necessary for establishing a multi-link using at least one of a beacon, a probe request, and a probe response. A first example, a second example, and a third example of the multi-link processing related to a method for implementing the allocation of various types of information to the beacon and the association and the association setup will be described hereinafter.

First Example

Figure 17:
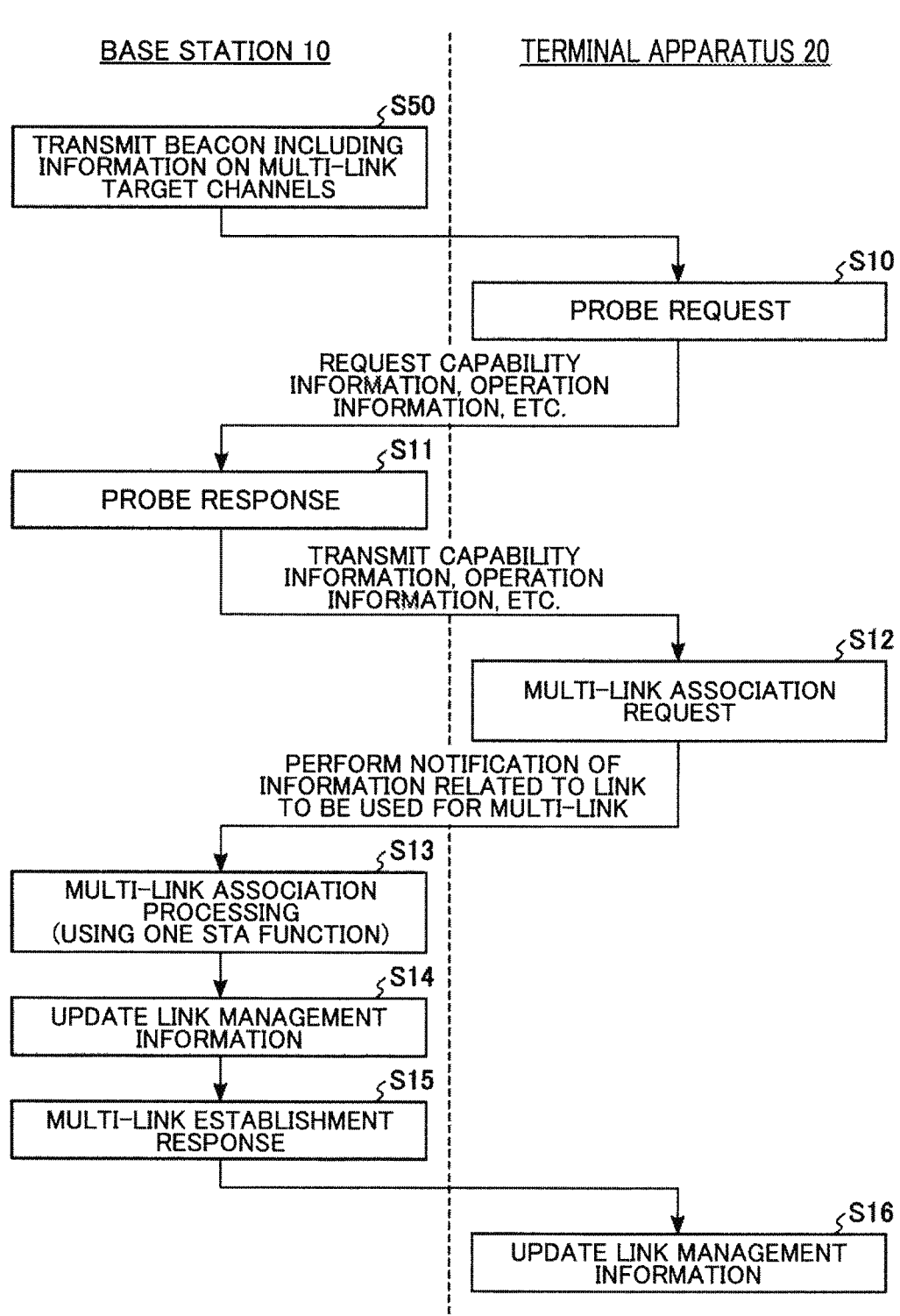
FIG. 17 is a flowchart showing a first example of multi-link processing in a wireless system according to a fifth embodiment.

FIG. 17 is a flowchart showing a first example of the multi-link processing in the wireless system 1 according to the fifth embodiment. As shown in FIG. 17, the first example of the multi-link processing has a configuration in which step S50 is added before step S10 in the multi-link processing described in the first embodiment.

Specifically, in the processing of step S50, the base station 10 transmits a beacon (beacon signal) including information on the channels that are multi-link targets to the terminal apparatus 20. This beacon signal includes information indicating that the base station 10 supports the multi-link and information on the channels that the base station 10 can use for the multi-link (information on the multi-link target channels). Note that the beacon signal transmitted in the processing of step S50 corresponds to the beacon signal shown in FIG. 15 referred to in the fourth embodiment. The beacon signal may also be transmitted by each of a plurality of channels that are multi-link targets. In other words, each channel that is a multi-link target may transmit a beacon signal including information related to the multi-link.

Upon receiving the beacon signal, the terminal apparatus 20 transmits a probe request to the base station 10 (step S10). In the probe request, the terminal apparatus 20 specifies at least two channels to be used for the multi-link, and requests the base station 10 to transmit capability information, operation information, and the like on the at least two channels. Capability information is information indicating the functions supported in the communication of each channel. Operation information is information including parameters required for communication. The capability information and operation information requested by the terminal apparatus 20 to the base station 10 in the processing of step S10 are pieces of information that are not included in the beacon signal transmitted by the base station 10 in the processing of step S50.

Upon receiving the probe request, the base station 10 transmits a probe response to the terminal apparatus 20 (step S11). In the probe response, the base station 10 transmits the capability information and the operation information in at least two channels requested by the terminal apparatus 20 to the terminal apparatus 20.

Upon receiving the probe response, the terminal apparatus 20 sends a multi-link association request to the base station 10 (step S12). In the multi-link association request, the terminal apparatus 20 notifies the base station 10 of information of the terminal apparatus 20 (capability information and operation information) related to at least two links (channels) that the terminal apparatus 20 wishes to use in the multi-link.

Upon receiving the multi-link association request, the base station 10 executes the multi-link association processing using one STA function, similarly to the first embodiment (step S13).

When the association processing of at least two STA functions is complete, the multi-link is established, and the link management unit 120 of the base station 10 updates the link management information 121 (step S14).

When the link management information 121 is updated, the base station 10 transmits a multi-link establishment response to the terminal apparatus 20 (step S15). The multi-link establishment response includes information on the channel on which the connection (link) has been established between the base station 10 and the terminal apparatus 20.

Upon receiving the multi-link establishment response, the link management unit 220 of the terminal apparatus 20 updates the link management information 221 (step S16). As a result, in the first example of the multi-link processing, data communication using the multi-link is possible between the base station 10 and the terminal apparatus 20.

Second Example

Figure 18:
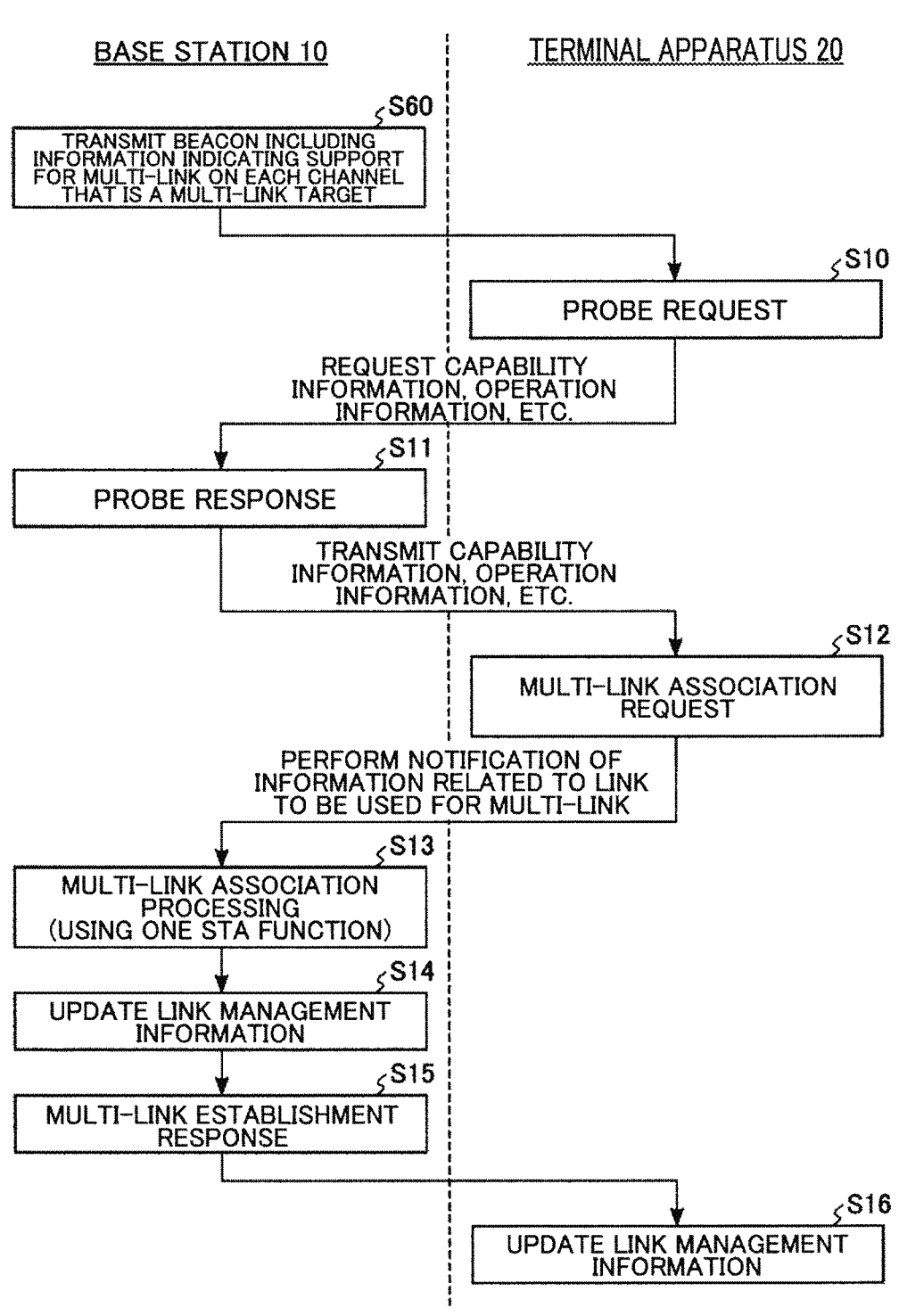
FIG. 18 is a flowchart showing a second example of multi-link processing in the wireless system according to the fifth embodiment.

FIG. 18 is a flowchart showing a second example of multi-link processing in the wireless system 1 according to the fifth embodiment. As shown in FIG. 18, the second example of multi-link processing has a configuration in which step S50 is replaced with step S60 in the first example of the multi-link processing.

Specifically, in the processing of step S60, the base station 10 transmits a beacon (beacon signal) including information indicating support for a multi-link to the terminal apparatus 20 using each channel that is a target of the multi-link. This beacon signal indicates that the base station 10 supports a multi-link, and does not include information on the multi-link target channels.

The terminal apparatus 20 receives a beacon signal from the base station 10 on each channel that the terminal apparatus 20 can use for communication. As a result, the link management unit 220 of the terminal apparatus 20 can keep track of the channels that can be used for the multi-link with the base station 10 (multi-link target channels) based on the channel that received the beacon signal including the information indicating support of the multi-link.

Then, the terminal apparatus 20 transmits a probe request to the base station 10 (step S10). In the probe request, the terminal apparatus 20 designates at least two channels to be used for the multi-link among the multi-link target channels that are kept track of by the link management unit 220 of the terminal apparatus 20, and requests transmission of capability information, operation information, and the like of the at least two channels from the base station 10.

Subsequently, the wireless system 1 executes the processing of steps S11 to S16. The processing of steps S11 to S16 in the second example of the multi-link processing is the same as the processing of steps S11 to S16 in the first example of the multi-link processing.

Third Example

Figure 19:
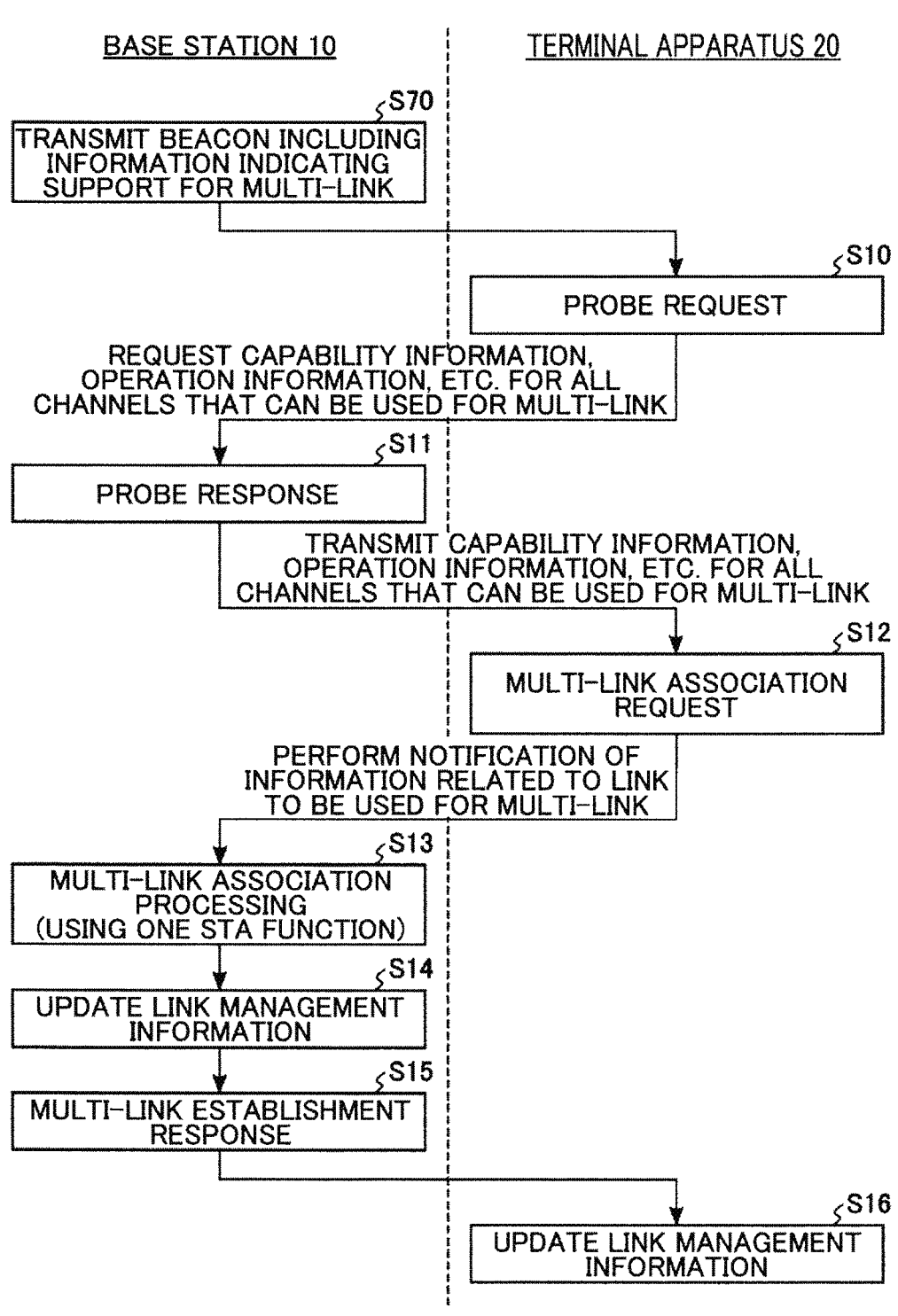
FIG. 19 is a flowchart showing a third example of multi-link processing in the wireless system according to the fifth embodiment.

FIG. 19 is a flowchart showing a third example of the multi-link processing in the wireless system 1 according to the fifth embodiment. As shown in FIG. 19, the third example of the multi-link processing has a configuration in which step S50 is replaced with step S70, and part of the processing of steps S10 and S11 is changed in the first example of the multi-link processing.

Specifically, in the processing of step S70, the base station 10 transmits a beacon (beacon signal) including information indicating support of the multi-link to the terminal apparatus 20. This beacon signal indicates that the base station 10 supports the multi-link, and does not include information on the multi-link target channels.

Upon receiving the beacon signal, the terminal apparatus 20 transmits a probe request to the base station 10 (step S10). In the probe request, the terminal apparatus 20 requests the base station 10 to transmit capability information, operation information, and the like for all channels that the base station 10 can use for the multi-link.

Upon receiving the probe request, the base station 10 transmits a probe response to the terminal apparatus 20 (step S11). In the probe response, the base station 10 transmits capability information and operational information for all channels that can be used for the multi-link to the terminal apparatus 20. As a result, the link management unit 220 of the terminal apparatus 20 can keep track of the channels that can be used for the multi-link with the base station 10.

Subsequently, the wireless system 1 executes the processing of steps S12 to S16. The processing of steps S12 to S16 in the third example of the multi-link processing is the same as the processing of steps S12 to S16 in the first example of the multi-link processing.

<5-2> Effect of Fifth Embodiment

As described above, all of the information required for communication (multi-link) using each channel does not need to be reported using the beacon. The information necessary for establishing the multi-link can be assigned to the beacon, the probe request, and the probe response, as in the first, second, and third examples described in the fifth embodiment. As a result, the wireless system 1 according to the fifth embodiment can optimize the efficiency of exchanging information used for establishing the multi-link according to the environment of the wireless system 1. Also, the wireless system 1 according to the fifth embodiment can suppress the load on one of the devices by concentrating the processing on either the base station 10 or the terminal apparatus 20.

<6> Other Modified Examples, Etc

In the above-described embodiment, each STA function may notify the corresponding link management unit when the link cannot be maintained due to movement of the terminal apparatus 20 or the like. Also, the link management unit 220 of the terminal apparatus 20 may change the multi-link state with the link management unit 120 of the base station 10 based on a notification from an STA function. Specifically, for example, the link management unit 220 of the terminal apparatus 20 and the link management unit 120 of the base station 10 may change the STA function used in the multi-link as appropriate. If the multi-link status is changed, the link management units 120 and 220 update the link management information 121 and 221 respectively. Also, the link management units 120 and 220 may update the association between the traffic and the STA function according to an increase or decrease in the number of links. The configuration of the wireless system 1 according to the first embodiment is merely an example, and other configurations may be used. For example, although a case was illustrated in which each of the base station 10 and the terminal apparatus 20 has three STA functions (wireless signal processing units), the present invention is not limited to this. The base station 10 may include at least two wireless signal processing units. Similarly, the terminal apparatus 20 may include at least two wireless signal processing units. Also, the number of channels that can be processed by each STA function can be set as appropriate according to the frequency band used. Each of the wireless communication modules 14 and 24 may support wireless communication in a plurality of frequency bands using a plurality of communication modules, or may support wireless communication in a plurality of frequency bands using a single communication module. If the operation described in the above-described embodiment can be executed, the arrangement of the association processing unit and the authentication processing unit can be changed as appropriate.

Also, the functional configurations of the base station 10 and the terminal apparatus 20 in the wireless system 1 according to the first embodiment are merely examples. The functional configuration of the base station 10 and the terminal apparatus 20 may have other names and groupings as long as the operations described in each embodiment can be executed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

Also, in the wireless system 1 according to the first embodiment, the CPU included in each of the base station 10 and the terminal apparatus 20 may be another circuit. For example, an MPU (Micro Processing Unit) or the like may be used instead of the CPU. Also, each of the processes described in each embodiment may be realized using dedicated hardware. The wireless system 1 according to each embodiment may include both processes executed by software and processes executed by hardware, or may include only one of them.

In each embodiment, the flowchart used to describe the operations is merely an example. The multi-link processing can be an operation of establishing a multi-link based on at least the request of the terminal apparatus 20, and the order of the processing may be changed within a possible range, or other processing may be added. Also, the format of the wireless frame described in the above embodiment is merely an example. The wireless system 1 may use another wireless frame format as long as it is possible to execute the multi-link processing described in each embodiment.

In the present specification, "connection" corresponds to a state in which communication of data is possible. The "connection request" corresponds to the terminal apparatus 20 requesting connection with the base station 10 in order to communicate with the network NW. Each of the "association processing" and the "authentication processing" corresponds to processing for assigning the terminal apparatus 20 to the base station 10.

Although several embodiments of the present invention have been described, these embodiments are presented as examples and are not intended to limit the scope of the invention. These novel embodiments can be implemented in various other embodiments, and various omissions, replacements, and changes can be made thereto without departing from the gist of the invention. These embodiments and modifications thereof are included in the scope and gist of the invention, as well as in the scope of the invention described in the claims and the range of equivalency thereof.

REFERENCE SIGNS LIST

1 Wireless system
10 Base station
20 Terminal apparatus
30 Server
11, 21 CPU
12, 22 ROM
13, 23 RAM
14, 24 Wireless communication module
15 Wired communication module
25 Display
26 Storage
110, 210 Data processing unit
120, 220 Link management unit
121, 221 Link management information
122, 131, 141, 151, 222, 231, 241, 251 Association processing unit
123, 132, 142, 152, 223, 232, 242, 252 Authentication processing unit
130, 140, 150, 230, 240, 250 Wireless signal processing unit

The invention claimed is:

1. A base station comprising:
a first wireless signal processing circuit configured to transmit and receive a wireless signal using a first channel;
a second wireless signal processing circuit configured to transmit and receive the wireless signal using a second channel different from the first channel; and processing circuitry configured to:
broadcast a beacon signal including link information indicating a plurality of channels that can be used for a multi-link;
receive a single association request from a terminal apparatus via one of the first wireless signal processing circuit or the second wireless signal processing circuit indicated in the beacon signal, the single association request requesting an establishment of the multi-link between the base station and the terminal apparatus; and
establish the multi-link with the terminal apparatus by responding to the single association request with a single response.

2. A terminal apparatus comprising:
a first wireless signal processing circuit configured to transmit and receive a wireless signal using a first channel;
a second wireless signal processing circuit configured to transmit and receive the wireless signal using a second channel different from the first channel; and
processing circuitry configured to:
receive a beacon signal including link information indicating a plurality of channels that can be used for a multi-link;
transmit a single association request to a base station via one of the first wireless signal processing circuit or the second wireless signal processing circuit indicated in the beacon signal, the single association request requesting an establishment of the multi-link between the base station and the terminal apparatus; and
establish the multi-link with the base station by receiving a single response to the single association request.

* * * * *